US008920556B2

(12) United States Patent
Shendy et al.

(10) Patent No.: US 8,920,556 B2
(45) Date of Patent: *Dec. 30, 2014

(54) CEMENTITIOUS COMPOSITION AND ADMIXTURE

(71) Applicants: Samy M. Shendy, Cuyahoga Falls, OH (US); Daniel Constantiner, Beachwood, OH (US)

(72) Inventors: Samy M. Shendy, Cuyahoga Falls, OH (US); Daniel Constantiner, Beachwood, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/836,639

(22) Filed: Mar. 15, 2013

(65) Prior Publication Data

US 2013/0199416 A1    Aug. 8, 2013

Related U.S. Application Data

(63) Continuation of application No. 13/528,903, filed on Jun. 21, 2012, now Pat. No. 8,460,460.

(60) Provisional application No. 61/500,873, filed on Jun. 24, 2011.

(51) Int. Cl.
C04B 24/10  (2006.01)
C04B 40/00  (2006.01)
C04B 24/00  (2006.01)
C04B 28/02  (2006.01)

(52) U.S. Cl.
CPC ............... *C04B 24/00* (2013.01); *C04B 24/10* (2013.01); *C04B 28/02* (2013.01); *C04B 40/0039* (2013.01)
USPC ........... 106/805; 106/708; 106/729; 106/731; 106/790; 106/801; 106/804

(58) Field of Classification Search
CPC ...... C04B 24/10; C04B 24/121; C04B 28/02; C04B 2103/22; C04B 2103/302; C04B 2103/304
USPC .......... 106/708, 729, 731, 790, 801, 804, 805
See application file for complete search history.

(56) References Cited

U.S. PATENT DOCUMENTS

| | | |
|---|---|---|
| 2,311,288 A | 2/1943 | Booth |
| 2,311,290 A | 2/1943 | Booth |
| 2,793,129 A | 5/1957 | Klein |
| 2,900,265 A | 8/1959 | Klein |
| 3,432,316 A | 3/1969 | Kelly et al. |
| 3,485,649 A | 12/1969 | Kelly et al. |
| 3,536,507 A | 10/1970 | Klein et al. |
| 3,857,715 A | 12/1974 | Humphrey |
| 3,992,260 A | 11/1976 | Suzuki et al. |
| 4,961,789 A | 10/1990 | Barrenechea |
| 5,017,234 A | 5/1991 | Gartner et al. |
| 5,369,122 A | 11/1994 | Steinmetzer |
| 5,429,675 A | 7/1995 | Cheung et al. |
| 5,435,845 A | 7/1995 | Villa et al. |
| 5,498,709 A | 3/1996 | Navia et al. |
| 5,639,319 A | 6/1997 | Daly |
| 5,641,352 A | 6/1997 | Jeknavorian et al. |
| 5,741,471 A | 4/1998 | Deutsch et al. |
| 5,961,712 A | 10/1999 | Sun et al. |
| 6,005,057 A | 12/1999 | El-Jazairi |
| 6,080,330 A | 6/2000 | Bloomer |
| 6,090,197 A | 7/2000 | Vivian et al. |
| 6,110,271 A | 8/2000 | Skaggs et al. |
| 6,149,834 A | 11/2000 | Gall et al. |
| 6,224,250 B1 | 5/2001 | Kreinheder et al. |
| 6,290,772 B1 | 9/2001 | Cheung et al. |
| 6,294,143 B1 | 9/2001 | Deutsch et al. |
| 6,416,574 B1 | 7/2002 | Steelhammer et al. |
| 6,416,684 B1 | 7/2002 | Bloomer |
| 6,436,310 B1 | 8/2002 | Hartley et al. |
| 6,518,223 B2 | 2/2003 | Schilling et al. |
| 6,541,545 B1 | 4/2003 | Simmons et al. |
| 6,545,068 B1 | 4/2003 | Simmons et al. |
| 6,613,138 B2 | 9/2003 | Welshimer et al. |
| 6,641,661 B1 | 11/2003 | Jardine et al. |
| 6,641,753 B1 | 11/2003 | Bloomer |
| 6,797,050 B2 | 9/2004 | Hoffman et al. |
| 6,800,129 B2 | 10/2004 | Jardine et al. |
| 6,811,604 B2 | 11/2004 | Mentink et al. |

(Continued)

FOREIGN PATENT DOCUMENTS

| | | |
|---|---|---|
| CN | 1089245 A | 7/1994 |
| CN | 101318792 A | 12/2008 |

(Continued)

OTHER PUBLICATIONS

Asadi, Mosen, Ph.D; Beet-Sugar Handbook; Wiley-Interscience; pp. 517-545; John Wiley & Sons, Inc.; © 2007.
Godbole, Jayant; "Ethanol from Cane Molasses"; DOE + BBI. Hawaii Ethanol Workshop, Nov. 14, 2002, pp. 1-40; Honolulu, Hawaii.
Olbrich, Hubert; "The Molasses";Institut für Zukerindustrie, Berlin, Germany; 1963.
Stolz, HNP, et al; "Enhancement of Sugar Production Part 2; Chromatographic Separation of Sugarcane Molasses"; Proc S Afr Sug Technol Assn (2001) 75; pp. 351-357.

(Continued)

*Primary Examiner* — Anthony J Green
(74) *Attorney, Agent, or Firm* — Curatolo Sidoti Co., LPA; Joseph G. Curatolo; Vincent A. Cortese

(57) ABSTRACT

A cementitious composition including at least one cementitious and/or pozzolanic material and at least one desugared molasses. A method of preparing a cementitious composition including forming a mixture of water, at least one cementitious and/or pozzolanic material and at least one desugared molasses. An admixture for cementitious compositions including: (i) at least one desugared molasses; and (ii) at least one alkanolamine and/or at least one polyhydroxyalkylamine.

25 Claims, 7 Drawing Sheets

(56) References Cited

U.S. PATENT DOCUMENTS

| | | |
|---|---|---|
| 6,824,606 B1 | 11/2004 | Alvarez Berenguer et al. |
| 6,907,708 B2 | 6/2005 | Naji et al. |
| 6,916,369 B2 | 7/2005 | Chun et al. |
| 7,048,793 B2 | 5/2006 | Chun et al. |
| 7,067,003 B2 | 6/2006 | Cooney |
| 7,087,110 B2 | 8/2006 | Jardine et al. |
| 7,160,384 B2 | 1/2007 | Jardine |
| 7,303,625 B2 | 12/2007 | Caveny et al. |
| 7,368,488 B2 | 5/2008 | Nishikawa et al. |
| 7,395,861 B2 | 7/2008 | Caveny et al. |
| 7,422,062 B2 | 9/2008 | Caveny et al. |
| 7,435,293 B2 | 10/2008 | Caveny et al. |
| 7,462,236 B2 | 12/2008 | Chun et al. |
| 7,473,379 B2 | 1/2009 | Ossian et al. |
| 7,662,884 B2 | 2/2010 | Yuasa et al. |
| 7,699,930 B2 | 4/2010 | Compton et al. |
| 7,811,378 B2 | 10/2010 | Nungeβ et al. |
| 7,836,954 B2 | 11/2010 | Morgan et al. |
| 7,887,630 B2 | 2/2011 | Tran et al. |
| 7,892,353 B2 | 2/2011 | Tran et al. |
| 7,922,811 B2 | 4/2011 | Jardine et al. |
| 2004/0082776 A1 | 4/2004 | Busse et al. |
| 2004/0149172 A1 | 8/2004 | Jardine et al. |
| 2009/0227709 A1 | 9/2009 | Maeder et al. |
| 2011/0146540 A1 | 6/2011 | Jardine et al. |

FOREIGN PATENT DOCUMENTS

| | | |
|---|---|---|
| CN | 101337788 A | 1/2009 |
| CN | 102115316 A | 7/2011 |
| FR | 1490178 A | 7/1967 |
| GB | 10424 | 0/1913 |
| GB | 939545 A | 10/1963 |
| KR | 2003003759 | 5/2003 |
| SU | 909124 A | 2/1982 |
| SU | 1027367 A | 7/1983 |
| WO | WO 00/44487 A1 | 8/2000 |
| WO | WO 2005/054149 A1 | 6/2005 |
| WO | WO 2005/110941 A1 | 11/2005 |
| WO | WO 2010/062484 A1 | 6/2010 |

OTHER PUBLICATIONS

Thompson, MC; "The Potential Application of Ion Exclusion Chromatography for Additional Sucrose Recovery from Molasses"; Proceedings of the South African Sugar Technologists' Association; Jun. 1994; pp. 105-108.

International Search Report, Form PCT/ISA/210, mailed Oct. 10, 2012, for corresponding PCT International Patent Application No. PCT/EP2012/061906.

Written Opinion, Form PCT/ISA/237, mailed Oct. 10, 2012, for corresponding PCT International Patent Application No. PCT/EP2012/061906.

International Search Report, Form PCT/ISA/210, mailed Oct. 5, 2012, for related PCT International Patent Application No. PCT/EP2012/061907.

Written Opinion, Form PCT/ISA/237, mailed Oct. 5, 2012, for related PCT International Patent Application No. PCT/EP2012/061907.

Office Action from the United States Patent and Trademark Office, mailed Dec. 10, 2012, for the related U.S. Appl. No. 13/528,908.

CEMENTITIOUS COMPOSITION AND ADMIXTURE

This application is a continuation application of U.S. Ser. No. 13/528,903 filed on Jun. 21, 2012, now U.S. Pat. No. 8,460,460, which claims the benefit of the filing date under 35 U.S.C. §119(e), of U.S. Provisional Application Ser. No. 61/500,873, filed Jun. 24, 2011, which applications are incorporated by reference herein.

Admixtures for cementitious compositions are of widely varying formulations, and are designed to achieve many different purposes. Admixtures typically include materials which are incorporated into the cementitious composition in order to provide certain physical properties to the cementitious composition, such as, but not limited to, increasing the strength of the composition once it begins to set, reducing the amount of water required for adequate workability of the composition, or altering the time required for the composition to set.

The cementitious composition industry is constantly searching for new admixtures which will render processes for producing the compositions more efficient and improve the resulting cementitious compositions.

Figure 1:
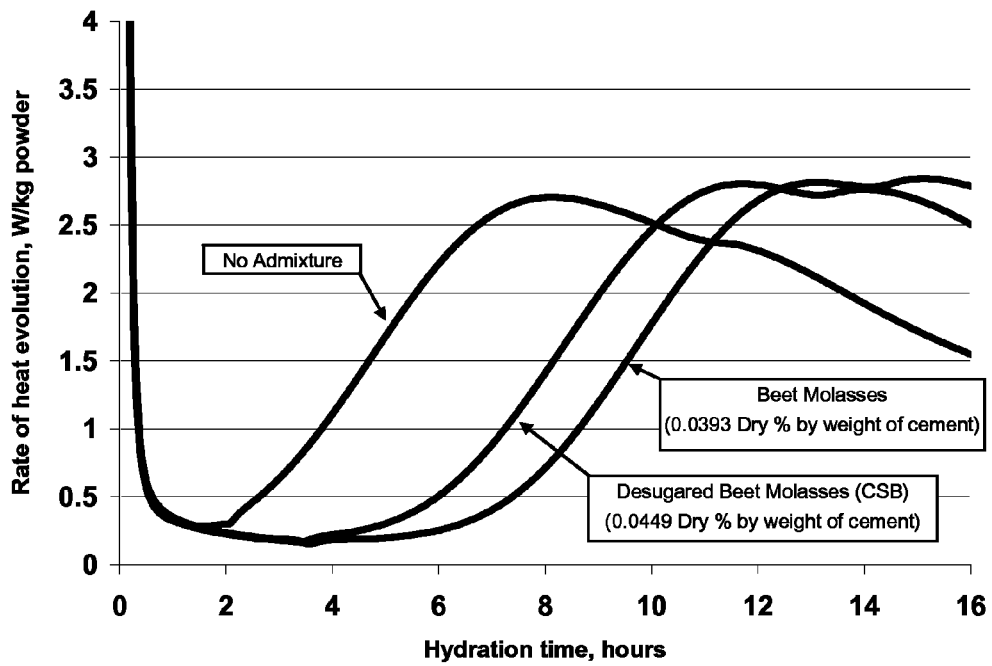
FIG. 1 is a graphical representation of rate of heat evolution of a cement paste containing no admixture compared with cement pastes containing sugar beet molasses and desugared sugar beet molasses.

Provided is an admixture and/or cementitious composition comprising at least one desugared molasses. Also provided is a method of preparing a cementitious composition comprising forming a mixture of water, at least one cementitious and/or pozzolanic material, and at least one desugared molasses.

As used herein, the term "desugared molasses" is defined as at least one of: (i) a molasses which has undergone a process to remove sugar from the molasses; or (ii) a molasses with a total sugar content less than or equal to about 45% by weight of the molasses, based on the dry weight of the molasses. In certain embodiments, a "desugared molasses" may have a sucrose content less than or equal to about 40% by weight of the molasses, based on the dry weight of the molasses. In certain embodiments, a "desugared molasses" may have a sucrose content less than or equal to about 35% by weight of the molasses, based on the dry weight of the molasses. In certain embodiments, a "desugared molasses" may have a sucrose content less than 30% by weight of the molasses, based on the dry weight of the molasses. In certain embodiments, a "desugared molasses" may have a total water content of less than about 40% by weight as manufactured, excluding any water added to the desugared molasses product after manufacturing, based on the total weight of the desugared molasses. In certain embodiments, a "desugared molasses" may exclude by-products of molasses fermentation processes.

Desugared molasses is available commercially from a number of sources, such as MidWest Agri-Commodities, San Rafael, Calif., American Crystal Sugar Company, Hillsboro, N.Dak. and Western Sugar Cooperative, Denver, Colo. As used herein, the term "desugared", when not used in the exact term "desugared molasses", refers to the result of a process to remove sugar from a material. The term "dry weight" refers to the total weight of a material or mixture, excluding the weight of any water present in the material or mixture.

Molasses is a byproduct of many sugar refining processes, and includes the material which is left over after sugar is extracted from a raw material, such as sugar beets or sugar cane. Molasses may contain high amounts of residual sugars, and for that reason molasses may be processed to extract additional sugar therefrom in order to maximize the sugar yield of a sugar refining process. The material leftover after molasses has been processed is sometimes referred to generally as desugared molasses. However, the definition of the term "desugared molasses" provided above extends beyond byproducts of processes utilized to extract sugar from molasses.

A non-limiting example of a process to remove sugar from sugar beet molasses is molasses desugaring by chromatography ("MDC"), described in Chapter 8 of *Beet Sugar Handbook* by Mosen Asaid, PhD (Wiley Interscience, 2007, pp. 517-545). The MDC process may be based on ion-exclusion chromatography technology. The MDC process works based on the exclusion or rejection of ionic compounds and the inclusion or absorption of nonionic compounds. The MDC process is a multi-component process separating not only the sucrose fraction (or extract) from the nonsucrose fraction (raffinate), but also recovering other valuable components of molasses, such as betaine.

Briefly outlined, the steps of the MDC process include: (1) diluting the molasses to 60% to 70% dry solids with water; (2) filtering the diluted molasses to remove suspended solids; (3) heating the filtered dilute molasses; (4) deaerating the dilute molasses; (5) feeding the deaerated dilute molasses through a distributor to a separator containing packed resin in sodium or potassium form; and (6) eluting the separator to remove the products trapped by the resin. As the feed passes through the resin, the nonionic substances (mainly sucrose) attach to the resin, and the ionic substances (mainly nonsucroses) continue moving through the resin bed. The ionic compounds fraction (raffinate) is collected first, and after additional processing becomes a desugared molasses. The elution water then removes sucrose and other nonionic components from the resin in order to produce additional sugar.

A non-limiting example of a process to remove sugar from sugar cane molasses is simulated moving bed chromatography ("SMB chromatography"), described in "Enhancement of Sugar Production Part 2: Chromatographic Separation of Sugarcane Molasses" by H. N. P. Stolz and P. I. Bekker (Proc S Afr Sug Technol Ass (2001) 75, pp. 351-357). The SMB chromatography process is similar to the MDC process describe above, with additional measures taken to ensure efficient separation of sugar cane molasses.

Those materials which fall into the definition of desugared molasses provided above are typically (but need not be) waste products of sugar or other agricultural refining processes. For this reason, desugared molasses may be less costly to procure than other components of conventional cementitious composition admixtures. Surprisingly, the subject desugared molasses provides benefits to cementitious compositions that meet or exceed those benefits provided by conventional admixtures, such as conventional water reducing admixtures.

In certain embodiments, a cementitious composition is provided which comprises at least one cementitious and/or pozzolanic material and at least one desugared molasses. For example, the cementitious composition may contain an admixture comprising at least one desugared molasses. The cementitious and/or pozzolanic material may comprise at least one of cement, fly ash, slag, such as blast furnace slag, silica fume or metakaolin. The cement may be a portland cement, a calcium aluminate cement, a magnesium phosphate cement, a magnesium potassium phosphate cement, a calcium sulfoaluminate cement, a gypsum-based cement, or any other suitable hydraulic binder.

In certain embodiments, the at least one desugared molasses may comprise at least one of desugared sugar beet molasses, desugared sugar cane molasses, or soy molasses (which may or may not be desugared). The subject desugared molasses, added to a cementitious composition either alone or in combination with other materials, may act in the cementitious composition as a water reducer (also called dispersants or plasticizers), a set retarder, an air entrainment aid, and/or a strength enhancer.

Desugared molasses is typically available as a liquid material, but it may be dried for use according to the present compositions and method. In certain embodiments, the at least one desugared molasses may contain an effective of amount of from greater than 0% to about 45% sugars by weight, based on the dry weight of the at least one desugared molasses. In further embodiments, the at least one desugared molasses may contain an effective amount of from greater than 0% to about 40% sucrose by weight, based on the dry weight of the at least one desugared molasses.

Desugared sugar beet molasses is a desirable product for use in the subject cementitious composition, admixture and method because it is not fit for human consumption, which reduces the value of the material. Samples of commercially available desugared sugar beet molasses were analyzed and determined to have the following composition (percentages are by weight based on total weight of the sample):

TABLE A

| | |
|---|---|
| Total Water - Karl-Fischer Method | 36-40% |
| Total Dry Matter Content | 60-64% |
| Protein | 6.3-6.9% |
| NPN Equivalent to Protein | 0.1-0.2% |
| Calcium | 0.05-0.3% |
| Phosphorous | <0.1% |
| Potassium | 6.7-8.1% |
| Sodium | 1.6-1.9% |
| Chloride | 0.4-0.5% |
| Sulfates | 0.6-1.5 |
| Reducing Sugars | 1.2-1.9% |
| Fructose | <0.1% |
| Glucose | <0.1% |
| Lactose | 0-1.2% |
| Maltose | 0-1.9% |
| Sucrose | 12-22% |

The analyzed desugared sugar beet molasses should not be construed to limit in any way the scope of the present subject matter. Desugared sugar beet molasses is merely one example of possible desugared molasses which may be utilized according to the present compositions and method. Further, the composition of desugared sugar beet molasses may vary widely, and some desugared sugar beet molasses may not contain components which fall within the ranges presented in Table A. Table A is provided for illustrative purposes only.

The subject desugared molasses may be combined with any of a number of conventional cementitious composition ingredients or admixtures which include, but are not limited to: dispersants, air entrainers, aggregates, pozzolans, fillers, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, alkali-reactivity reducers, bonding admixtures, shrinkage reducing admixtures, and any other ingredient or admixture that does not adversely affect the properties of the cementitious composition. The cementitious compositions need not contain one of each of the foregoing materials.

In various embodiments, the dispersant may be at least one of traditional water reducers such as lignosulfonates, melamine sulfonate resins, sulfonated melamine formaldehyde condensates, salts of sulfonated melamine sulfonate condensates, beta naphthalene sulfonates, naphthalene sulfonate formaldehyde condensate resins, salts of sulfonated naphthalene sulfonate condensates, or urea formaldehyde-based dispersants; or, polycarboxylate, polyaspartate, or oligomeric dispersants.

In various embodiments, the shrinkage reducers may comprise diols, ethylene glycol, propylene glycol, polyethylene glycols, and/or polypropylene glycols.

In various embodiments, the set and strength accelerators/enhancers may comprise at least one of nitrates, chlorides, thiocyanates, primary amines, secondary amines, tertiary amines, alkanolamines or polyhydroxyalkylamines. Examples of suitable alkanolamines and polyhydroxyalkylamines include, but are not limited to, triethanolamine, tri-(hydroxyethyl)ethylenediamines, and triisopropylamine.

In various embodiments, aggregate may be included in the cementitious formulation to provide for mortars which include fine aggregate, and concretes which also include coarse aggregate. The fine aggregates are materials that almost entirely pass through a Number 4 sieve (ASTM C125 and ASTM C33), such as silica sand. The coarse aggregates are materials that are predominantly retained on a Number 4 sieve (ASTM C125 and ASTM C33), such as silica, quartz, crushed marble, glass spheres, granite, limestone, calcite, feldspar, alluvial sands, sand or any other durable aggregate, and mixtures thereof.

Fillers for cementitious compositions may include, but are not limited to, aggregate, sand, stone, gravel, pozzolan, finely divided minerals, such as raw quartz, limestone powder, fibers, and the like, depending upon the intended application. As non-limiting examples, stone may include river rock, limestone, granite, sandstone, brownstone, conglomerate, calcite, dolomite, marble, serpentine, travertine, slate, bluestone, gneiss, quartzitic sandstone, quartzite and combinations thereof.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, slag, such as blast furnace slag, silica fume, metakaolin, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline cherts, and some shales. Fly ash is defined in ASTM C618.

If used, silica fume can be uncompacted or can be partially compacted or added as a slurry. Silica fume additionally reacts with the hydration byproducts of the cement binder, which may provide for increased strength of the finished articles and may decrease the permeability of the finished articles.

In certain embodiments, the at least one desugared molasses may be present in the cementitious composition in an amount of from about 0.005 to about 0.4 dry weight percent, based on the weight of cementitious material. In certain embodiments, the at least one desugared molasses may be present in the cementitious composition in an amount of from about 0.01 to about 0.25 dry weight percent, based on the weight of cementitious material. In certain embodiments, the at least one desugared molasses may be present in the cementitious composition in an amount of from about 0.02 to about 0.4 dry weight percent, based on the weight of cementitious material. In certain embodiments, the at least one desugared molasses may be present in the cementitious composition in an amount of from about 0.02 to about 0.25 dry weight percent, based on the weight of cementitious material. As used herein, including in the appended claims, "based on the weight of cementitious material" refers to the total dry weight of all cementitious and/or pozzolanic materials present in a cementitious composition.

When added to the cementitious composition in an amount of from about 0.005 to about 0.25 dry weight percent, based on the weight of cementitious material, the at least one desugared molasses may act as a water reducer. When added to the cementitious composition in an amount of from about 0.02 to about 0.4 dry weight percent, based on the weight of cementitious material, the at least one desugared molasses may act as a set time retarder. When added to the cementitious composition in an amount of from about 0.02 to about 0.25 dry weight percent, based on the weight of cementitious material, the at least one desugared molasses may act as both a water reducer and a set time retarder.

In certain embodiments, the cementitious composition and/or the admixture therefor may further comprise at least one set accelerator and/or at least one strength enhancer. The at least one set accelerator and/or at least one strength enhancer may be present in the cementitious composition in an amount of from about 0.0002 to about 2 weight percent not including added water, based on the weight of cementitious material. As used herein, the phrase "not including added water" means that the weight of the subject material does not include the weight of any water which is not required for or produced during manufacture of the material In certain embodiments, the cementitious composition and/or the admixture therefor may further comprise at least one alkanolamine and/or at least one polyhydroxyalkylamine. The at least one alkanolamine and/or at least one polyhydroxyalkylamine may be present in the cementitious composition in an amount of from about 0.008 to about 0.1 weight percent not including added water, based on the weight of cementitious material.

In certain embodiments, provided is a method of preparing a cementitious composition comprising forming a mixture of water, at least one cementitious and/or pozzolanic material, and at least one desugared molasses. The desugared molasses may be added to the cementitious composition alone or in combination with any other materials, such as but not limited to other cement admixtures or fillers.

In certain embodiments, provided is an admixture for cementitious compositions comprising: (i) at least one desugared molasses; and (ii) at least one additional active admixture component. The additional active admixture component may be any active admixture which will not adversely affect the activity that the desugared molasses may have on a cementitious composition. The additional active admixture component may be at least one of a water reducer, set retarder, set accelerator, strength enhancer, air detrainer, corrosion inhibitor, shrinkage reducers, viscosity modifiers, water proffers, permeability reducers, alkali silica reducers, or combinations thereof.

In certain embodiments, the set accelerator and/or strength enhancer comprises at least one alkanolamine and/or at least one polyhydroxyalkylamine. In certain embodiments, the set accelerator may additionally or alternatively comprise at least one of thiocyanates, nitrates or chlorides.

In certain embodiments, the at least one desugared molasses may be present in the admixture in an amount of from about 2 to about 98 weight percent, based on the total weight of active ingredients of the admixture. In further embodiments, the at least one desugared molasses may be present in the admixture in an amount of from about 8 to about 62 weight percent, based on the total weight of active ingredients of the admixture. As used herein, including in the appended claims, when referring to ingredients of an admixture, water is not included in the definition of "active ingredient".

In certain embodiments, the at least one alkanolamine and/or at least one polyhydroxyalkylamine is present in the admixture in an amount of from about 0.1 to about 25 weight percent, based on the total weight of active ingredients of the admixture. In further embodiments, the at least one alkanolamine and/or at least one polyhydroxyalkylamine is present in the admixture in an amount of from about 0.2 to about 15 weight percent, based on the total weight of active ingredients of the admixture.

The following examples are set forth merely to further illustrate the subject cementitious composition and/or admixture. The illustrative examples should not be construed as limiting the cementitious composition and/or admixture in any manner.

FIG. 1 depicts the rate of heat evolution from the hydration reaction of cement pastes containing no admixture or admixtures made with the indicated levels of a sugar beet molasses or a desugared sugar beet molasses. In relation to the paste containing no admixture, both the molasses and desugared molasses delayed the hydration reaction of the cement pastes. However, even with a higher dosage of the desugared molasses in relation to molasses, the retardation of the hydration reaction was significantly less with the desugared molasses.

Figure 2:
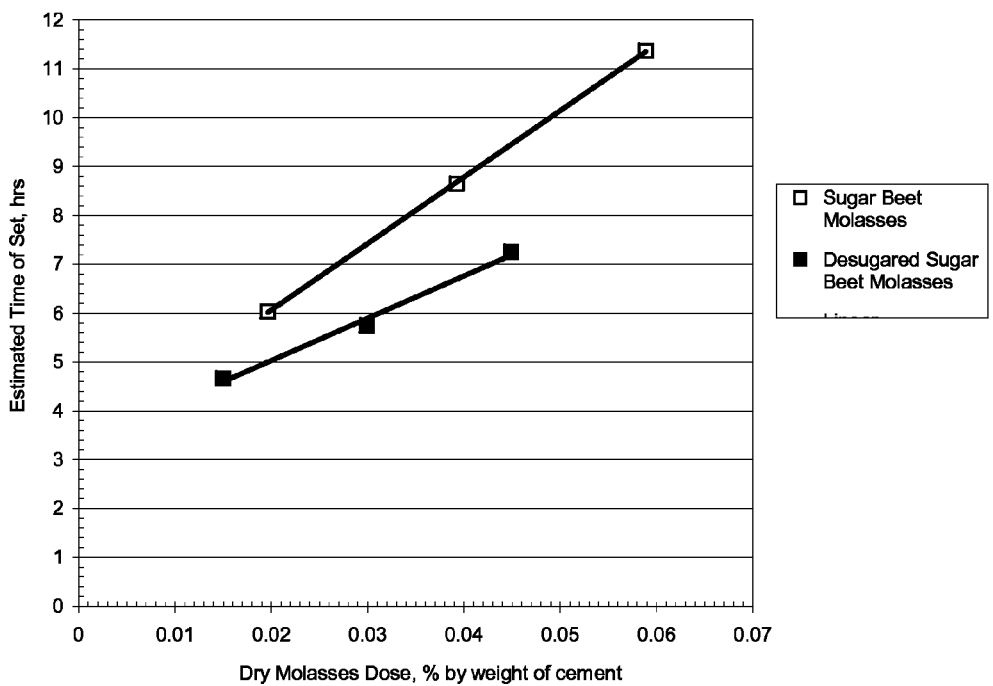
FIG. 2 is a graphical representation of set time of cementitious compositions containing sugar beet molasses compared with cementitious compositions containing desugared sugar beet molasses.

FIG. 2 compares calorimetry of hydration reactions of various cementitious compositions containing sugar beet molasses or desugared sugar beet molasses in order to estimate the time of set, in hours, of each cementitious composition. The estimated time of set is based on reaching a hydration rate of 1 W/kg. The retarding affect of the desugared molasses is significantly less than the molasses.

The following sample cementitious compositions included various admixtures or no admixture, as listed in the following Tables. Admixture A included desugared sugar beet molasses. Admixture B included triethanolamine. Admixture C included water, desugared sugar beet molasses, and about 3 weight percent of triethanolamine based on the total weight of the admixture, including water. Admixture D included water, desugared sugar beet molasses, and about 6 weight percent of triethanolamine based on the total weight of the admixture, including water. Admixture E was MB-AE™ 90 air entraining admixture for cementitious compositions, available from BASF Construction Chemicals, Cleveland, Ohio. Admixture F included a conventional water reducing admixture. The admixture doses listed in the following tables are provided in percent by weight, based on the total weight of all cementitious materials.

The Sample concrete compositions described below were prepared and tested to determine various physical characteristics of the compositions. The slump of each Sample was determined five minutes after the Sample was prepared according to ASTM C143. The air content of each Sample was determined five minutes after the Sample was prepared according to ASTM C231. The initial and final set times of each Sample were determined according to ASTM C403. The compressive strength of each Sample was determined at various intervals according to ASTM C39. The ASTM standards listed in this paragraph are incorporated herein by reference as if fully written out below. Blank fields in the tables representing results of these tests indicate that testing was not conducted.

Figure 3:
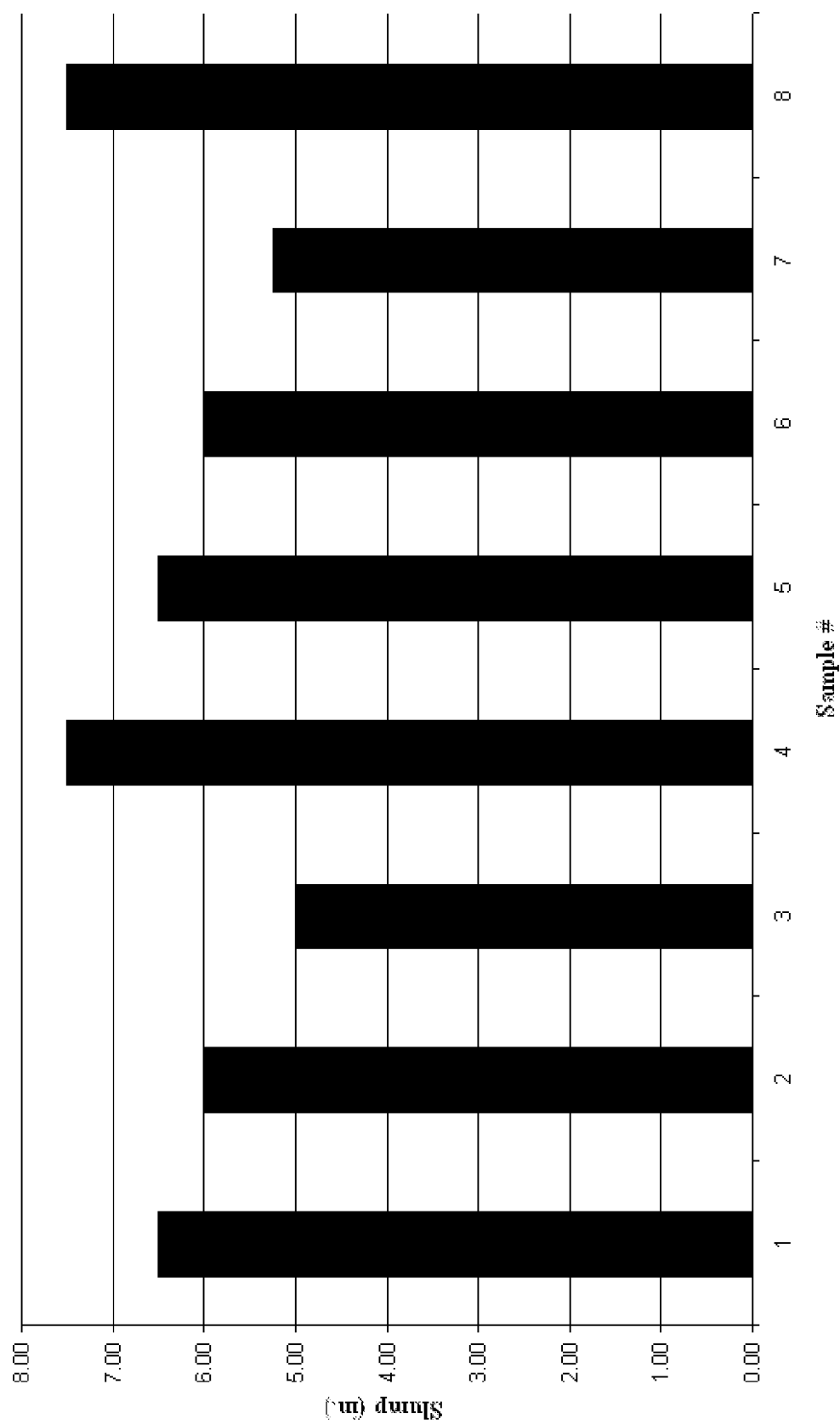
FIG. 3 is a graphical representation of slump data of sample cementitious compositions containing fly ash.

Samples 1-4 were prepared using Type I APC low-alkali cement and Class F Fly Ash to create concrete compositions with admixture dosages according to Table 1A. Samples 1-4 each contained cement, fly ash, sand, stone and water. The water to cementitious material proportion was 0.58 for Sample 1 and 0.54 for Samples 2-4. In all of Samples 1-4, the fly ash represented 25% of the total cementitious materials, and the sand to total aggregate (sand and stone) proportion was 0.44. The results of the testing of Samples 1-4 are shown in Table 1B. Slump data from Table 1B Samples are shown in FIG. 3.

TABLE 1A

| Sample # | 1 | 2 | 3 | 4 |
|---|---|---|---|---|
| Admixture 1 | None | A | A | A |
| Dose (wt %) |  | 0.105 | 0.105 | 0.105 |
| Admixture 2 | None | None | B | B |
| Dose (wt %) |  |  | 0.051 | 0.025 |

TABLE 1B

| Sample # | 1 | 2 | 3 | 4 |
|---|---|---|---|---|
| Slump (in) | 6.50 | 6.00 | 5.00 | 7.50 |
| Slump (cm) | 16.5 | 15.2 | 12.7 | 19.1 |
| Air Content (%) | 1.1 | 1.4 | 1.9 | 1.5 |
| Initial Set (hrs) | 4.3 | 6.8 | 7.1 | 7.1 |
| Final Set (hrs) | 5.8 | 8.2 | 8.3 | 8.3 |
| Comp. Strength |  |  |  |  |
| 1 Day (psi) | 1280 | 1510 | 1480 | 1410 |
| 1 Day (N/mm$^2$) | 8.82 | 10.4 | 10.2 | 9.72 |
| 7 Day (psi) | 2650 | 2960 | 3130 | 2790 |
| 7 Day (N/mm$^2$) | 18.3 | 20.4 | 21.6 | 19.2 |
| 28 Day (psi) | 3970 |  | 4420 | 3910 |
| 28 Day (N/mm$^2$) | 27.4 |  | 30.5 | 27.0 |

Samples 5-8 were prepared using Type I Hercules high-alkali cement and Class F Fly Ash to create concrete compositions with admixture dosages according to Table 2A. Samples 5-8 each contained cement, fly ash, sand, stone and water. The water to cementitious material proportion was 0.55 for Sample 5 and 0.54 for Samples 6-8. In all of Samples 5-8, the fly ash represented 25% of the total cementitious materials, and the sand to total aggregate (sand and stone) proportion was 0.44. The results of the testing of Samples 5-8 are shown in Table 2B. Slump data from Table 2B Samples are shown in FIG. 3.

TABLE 2A

| Sample # | 5 | 6 | 7 | 8 |
|---|---|---|---|---|
| Admixture 1 | None | A | A | A |
| Dose (wt %) |  | 0.105 | 0.105 | 0.105 |
| Admixture 2 | None | None | B | B |
| Dose (wt %) |  |  | 0.051 | 0.025 |

TABLE 2B

| Sample # | 5 | 6 | 7 | 8 |
|---|---|---|---|---|
| Slump (in) | 6.50 | 6.00 | 5.25 | 7.50 |
| Slump (cm) | 16.5 | 15.2 | 13.3 | 19.1 |
| Air Content (%) | 1.5 | 1.9 | 2.5 | 2.0 |
| Initial Set (hr) | 3.9 | 5.8 | 6.4 | 6.6 |
| Final Set (hr) | 5.1 | 6.9 | 7.4 | 7.6 |
| Comp. Strength |  |  |  |  |
| 1 Day (psi) | 1800 | 1450 | 1450 | 1170 |
| 1 Day (N/mm$^2$) | 12.4 | 10.0 | 10.0 | 8.07 |
| 7 Day (psi) | 2570 | 2360 | 2910 | 2800 |
| 7 Day (N/mm$^2$) | 17.7 | 16.3 | 20.1 | 19.3 |
| 28 Day (psi) | 4080 | 4050 | 3990 | 3590 |
| 28 Day (N/mm$^2$) | 28.1 | 27.9 | 27.5 | 24.7 |

As shown in FIG. 3, the desugared molasses of Admixture A, alone or in combination with Admixture B, provided improved slump properties of cementitious compositions containing fly ash with respect to the cementitious compositions without admixtures.

Samples 9-13 were prepared using Type I Hercules high-alkali cement and Class F Fly Ash to create concrete compositions with admixture dosages according to Table 3A. Samples 9-13 each contained cement, fly ash, sand, stone and water. The water to cementitious material proportion was 0.59 for Sample 9 and 0.55 for Samples 10-13. In all of Samples 9-13, the fly ash represented 25% of the total cementitious materials, and the sand to total aggregate (sand and stone) proportion was 0.44. The results of the testing of Samples 9-13 are shown in Table 3B.

TABLE 3A

| Sample # | 9 | 10 | 11 | 12 | 13 |
|---|---|---|---|---|---|
| Admixture 1 | None | A | A | A | A |
| Dose (wt %) |  | 0.105 | 0.105 | 0.105 | 0.105 |
| Admixture 2 | None | None | B | B | B |
| Dose (wt %) |  |  | 0.012 | 0.025 | 0.051 |

TABLE 3B

| Sample # | 9 | 10 | 11 | 12 | 13 |
|---|---|---|---|---|---|
| Slump (in) | 5.25 | 4.50 | 4.50 | 4.00 | 5.00 |
| Slump (cm) | 13.3 | 11.4 | 11.4 | 10.2 | 12.7 |
| Air Content (%) | 1.7 | 2.3 | 2.4 | 2.3 | 2.3 |
| Initial Set (hr) | 5.3 | 8.4 | 8.2 | 8.2 | 8.9 |
| Final Set (hr) | 7.0 | 10.2 | 10.0 | 10.2 | 10.7 |
| Comp. Strength |  |  |  |  |  |
| 1 Day (psi) | 1090 | 1260 | 1260 | 1190 | 1160 |
| 1 Day (N/mm$^2$) | 7.51 | 8.69 | 8.69 | 8.20 | 8.00 |
| 7 Day (psi) | 2500 | 3115 | 2850 | 2995 | 2765 |

TABLE 3B-continued

| Sample # | 9 | 10 | 11 | 12 | 13 |
|---|---|---|---|---|---|
| 7 Day (N/mm$^2$) | 17.2 | 21.5 | 19.6 | 20.7 | 19.1 |
| 28 Day (psi) | 3920 | 4620 | 4580 | 4640 | 4440 |
| 28 Day (N/mm$^2$) | 27.0 | 31.9 | 31.6 | 32.0 | 30.6 |

Samples 14-18 were prepared using Type I APC low-alkali cement and Class F Fly Ash to create concrete compositions with admixture dosages according to Table 4A. Samples 14-18 each contained cement, fly ash, sand, stone and water. The water to cementitious material proportion was 0.60 for Sample 14, 0.54 for Samples 15-16, and 0.52 for Samples 17-18. In all of Samples 14-18, the fly ash represented 25% of the total cementitious materials, and the sand to total aggregate (sand and stone) proportion was 0.44. The results of the testing of Samples 14-18 are shown in Table 4B.

TABLE 4A

| Sample # | 14 | 15 | 16 | 17 | 18 |
|---|---|---|---|---|---|
| Admixture 1 | None | A | A | A | A |
| Dose (wt %) |  | 0.105 | 0.105 | 0.105 | 0.105 |
| Admixture 2 | None | None | B | B | B |
| Dose (wt %) |  |  | 0.012 | 0.025 | 0.051 |

TABLE 4B

| Sample # | 14 | 15 | 16 | 17 | 18 |
|---|---|---|---|---|---|
| Slump (in) | 6.25 | 4.50 | 4.25 | 3.25 | 5.25 |
| Slump (cm) | 15.9 | 11.4 | 10.8 | 8.26 | 13.3 |
| Air Content (%) | 1.1 | 1.6 | 1.9 | 1.9 | 2.0 |
| Initial Set (hr) | 6.3 | 9.2 | 9.1 | 8.9 | 9.6 |
| Final Set (hr) | 8.9 | 11.8 | 11.8 | 11.4 | 11.7 |
| Comp. Strength |  |  |  |  |  |
| 1 Day (psi) | 1020 | 1110 | 1180 | 1260 | 1040 |
| 1 Day (N/mm$^2$) | 7.03 | 7.65 | 8.13 | 8.69 | 7.17 |
| 7 Day (psi) | 2715 | 3255 | 3425 | 3530 | 3470 |
| 7 Day (N/mm$^2$) | 18.7 | 22.4 | 23.6 | 24.3 | 23.9 |
| 28 Day (psi) | 3960 | 4670 | 4760 | 4650 | 4750 |
| 28 Day (N/mm$^2$) | 27.3 | 32.2 | 32.8 | 32.1 | 32.7 |

Figure 4:
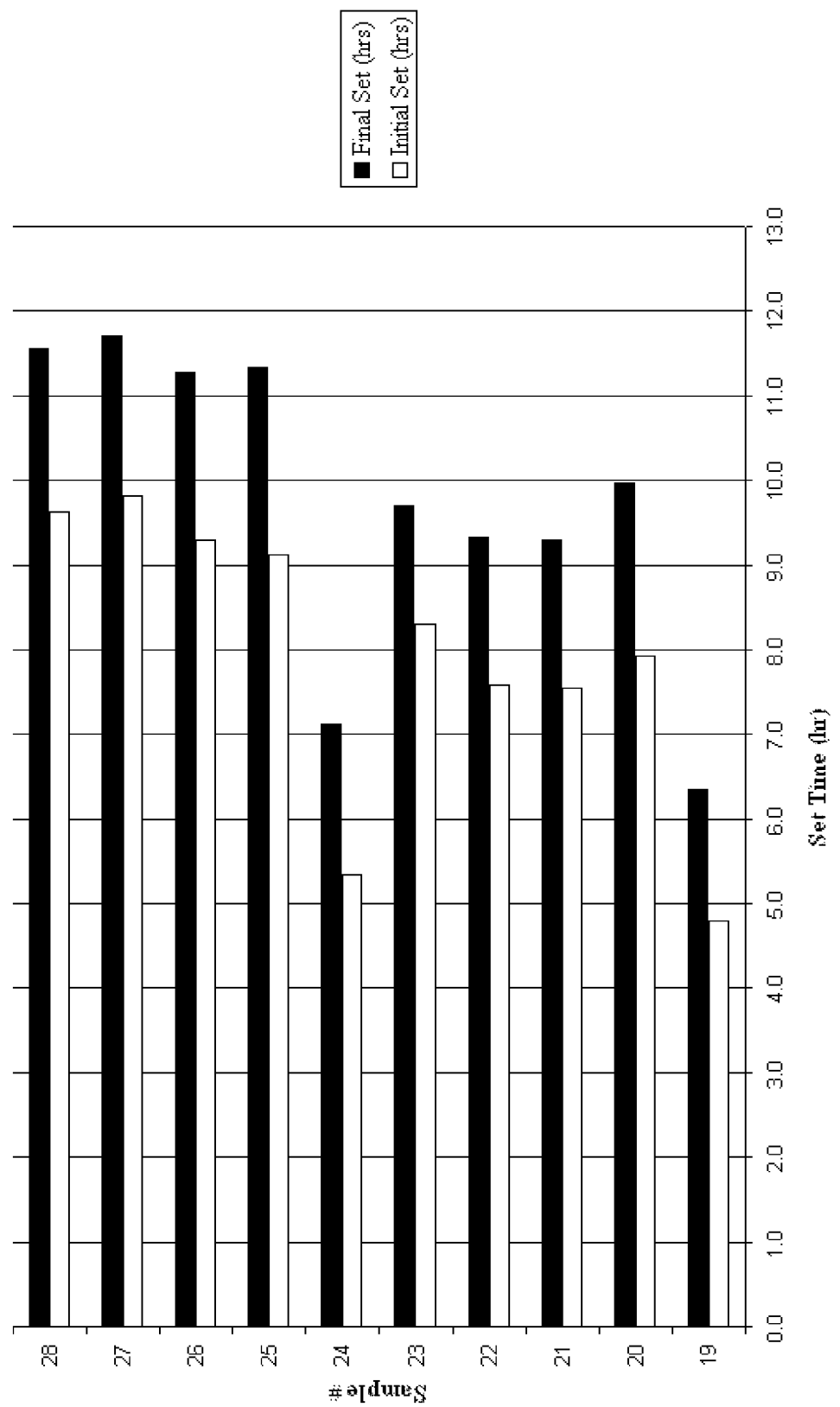
FIG. 4 is a graphical representation of set time data of sample cementitious compositions with and without fly ash.

Samples 19-23 were prepared using Type I Lehigh moderate-alkali cement to create concrete compositions with admixture dosages according to Table 5A. Samples 19-23 each contained cement, sand, stone and water. The water to cement proportion was 0.56 for Sample 19 and 0.51 for Samples 20-23. In all of Samples 19-23, the sand to total aggregate (sand and stone) proportion was 0.44, with Samples 20-23 having about 2% more aggregate than Sample 19, by weight. The results of the testing of Samples 19-23 are shown in Table 5B. Set time data from Table 5B Samples are shown in FIG. 4.

TABLE 5A

| Sample # | 19 | 20 | 21 | 22 | 23 |
|---|---|---|---|---|---|
| Admixture 1 | None | A | A | A | A |
| Dose (wt %) |  | 0.105 | 0.105 | 0.105 | 0.105 |
| Admixture 2 | None | None | B | B | B |
| Dose (wt %) |  |  | 0.012 | 0.025 | 0.051 |

TABLE 5B

| Sample # | 19 | 20 | 21 | 22 | 23 |
|---|---|---|---|---|---|
| Slump (in) | 5.75 | 4.75 | 4.75 | 3.75 | 6.75 |
| Slump (cm) | 14.6 | 12.1 | 12.1 | 9.53 | 17.1 |
| Air Content (%) | 1.7 | 2.4 | 2.5 | 2.8 | 2.8 |
| Initial Set (hr) | 4.8 | 7.9 | 7.5 | 7.6 | 8.3 |
| Final Set (hr) | 6.4 | 10.0 | 9.3 | 9.3 | 9.7 |
| Comp. Strength |  |  |  |  |  |
| 1 Day (psi) | 1780 | 1960 | 2390 | 2330 | 2260 |
| 1 Day (N/mm$^2$) | 12.3 | 13.5 | 16.5 | 16.1 | 15.6 |
| 7 Day (psi) | 3720 | 4450 | 4730 | 4470 | 4310 |
| 7 Day (N/mm$^2$) | 25.6 | 30.7 | 32.6 | 30.8 | 29.7 |

Samples 24-28 were prepared using Type I Lehigh moderate-alkali cement and Class F Fly Ash to create concrete compositions with admixture dosages according to Table 6A. Samples 24-28 each contained cement, fly ash, sand, stone and water. The water to cementitious material proportion was 0.55 for Sample 24, 0.53 for Samples 25-26, and 0.52 for Samples 27-28. In all of Samples 24-28, the fly ash represented 25% of the total cementitious materials, and the sand to total aggregate (sand and stone) proportion was 0.44, with Samples 25-28 having about 2% more aggregate than Sample 24, by weight. The results of the testing of Samples 24-28 are shown in Table 6B. Set time data from Table 6B Samples are shown in FIG. 4.

TABLE 6A

| Sample # | 24 | 25 | 26 | 27 | 28 |
|---|---|---|---|---|---|
| Admixture 1 | None | A | A | A | A |
| Dose (wt %) |  | 0.105 | 0.105 | 0.105 | 0.105 |
| Admixture 2 | None | None | B | B | B |
| Dose (wt %) |  |  | 0.012 | 0.025 | 0.051 |

TABLE 6B

| Sample # | 24 | 25 | 26 | 27 | 28 |
|---|---|---|---|---|---|
| Slump (in) | 7.00 | 7.25 | 6.75 | 6.25 | 7.00 |
| Slump (cm) | 17.8 | 18.4 | 17.1 | 15.9 | 17.8 |
| Air Content (%) | 1.5 | 1.9 | 2.2 | 2.2 | 2.6 |
| Initial Set (hr) | 5.3 | 9.1 | 9.3 | 9.8 | 9.6 |
| Final Set (hr) | 7.1 | 11.3 | 11.3 | 11.7 | 11.6 |
| Comp. Strength |  |  |  |  |  |
| 1 Day (psi) | 1017 | 1050 | 1200 | 1160 | 1220 |
| 1 Day (N/mm$^2$) | 7.01 | 7.24 | 8.27 | 8.00 | 8.41 |
| 7 Day (psi) | 2530 | 2670 | 3130 | 3300 | 3230 |
| 7 Day (N/mm$^2$) | 17.4 | 18.4 | 21.6 | 22.8 | 22.3 |

As shown in FIG. 4, the desugared molasses of Admixture A, alone or in combination with Admixture B, retarded the set time of the cementitious composition (both with and without fly ash) as compared to a cementitious composition without admixtures.

Samples 29-36 were prepared using Type I Lehigh moderate-alkali cement and slag to create concrete compositions with admixture dosages according to Table 7. Samples 29-36 each contained cement, slag, sand, stone and water. The water to cementitious material proportion was 0.58 for Sample 29 and 0.54 for Samples 30-36. In all of Samples 29-36, the slag represented 50% of the total cementitious materials, and the sand to total aggregate (sand and stone) proportion was 0.43, with Samples 30-36 having about 2% more aggregate than Sample 29, by weight. The results of the testing of Samples 29-36 are also shown in Table 7. Compressive strength data from Table 7 Samples are shown in FIG. 5.

TABLE 7

| | Sample # | | | | | | | |
|---|---|---|---|---|---|---|---|---|
| | 29 | 30 | 31 | 32 | 33 | 34 | 35 | 36 |
| Admixture 1 | None | A | A | A | A | A | A | A |
| Dose (wt %) | | 0.105 | 0.105 | 0.105 | 0.105 | 0.105 | 0.105 | 0.105 |
| Admixture 2 | None | B | B | B | B | B | B | None |
| Dose (wt %) | | 0.051 | 0.038 | 0.032 | 0.025 | 0.018 | 0.012 | |
| Slump (in) | 7.25 | 7.25 | 7.75 | 4.25 | 4.00 | 4.00 | 4.00 | 3.25 |
| Slump (cm) | 18.4 | 18.4 | 19.7 | 10.8 | 10.2 | 10.2 | 10.2 | 8.26 |
| Air Content (%) | 2.0 | 2.7 | 2.9 | 2.9 | 2.5 | 3.0 | 2.4 | 2.5 |
| Initial Set (hr) | 4.6 | 8.8 | 8.9 | 8.5 | 8.3 | 8.4 | 8.3 | 8.1 |
| Final Set (hr) | 7.4 | 11.0 | 10.9 | 10.8 | 10.7 | 10.6 | 10.5 | 10.4 |
| Comp. Strength | | | | | | | | |
| 1 Day (psi) | 880 | 1040 | 1040 | 1160 | 1210 | 1110 | 1090 | 1030 |
| 1 Day (N/mm$^2$) | 6.07 | 7.17 | 7.17 | 8.00 | 8.34 | 7.65 | 7.51 | 7.10 |
| 7 Day (psi) | 3980 | 5140 | 5370 | 5560 | 5420 | 5260 | 5470 | 5370 |
| 7 Day (N/mm$^2$) | 27.4 | 35.4 | 37.0 | 38.3 | 37.4 | 36.6 | 37.7 | 37.0 |
| 28 Day (psi) | 5760 | 7130 | 7210 | 7310 | 7450 | 7100 | 7510 | 7310 |
| 28 Day (N/mm$^2$) | 39.7 | 49.2 | 49.7 | 50.4 | 51.4 | 48.9 | 51.8 | 50.4 |

Figure 5:
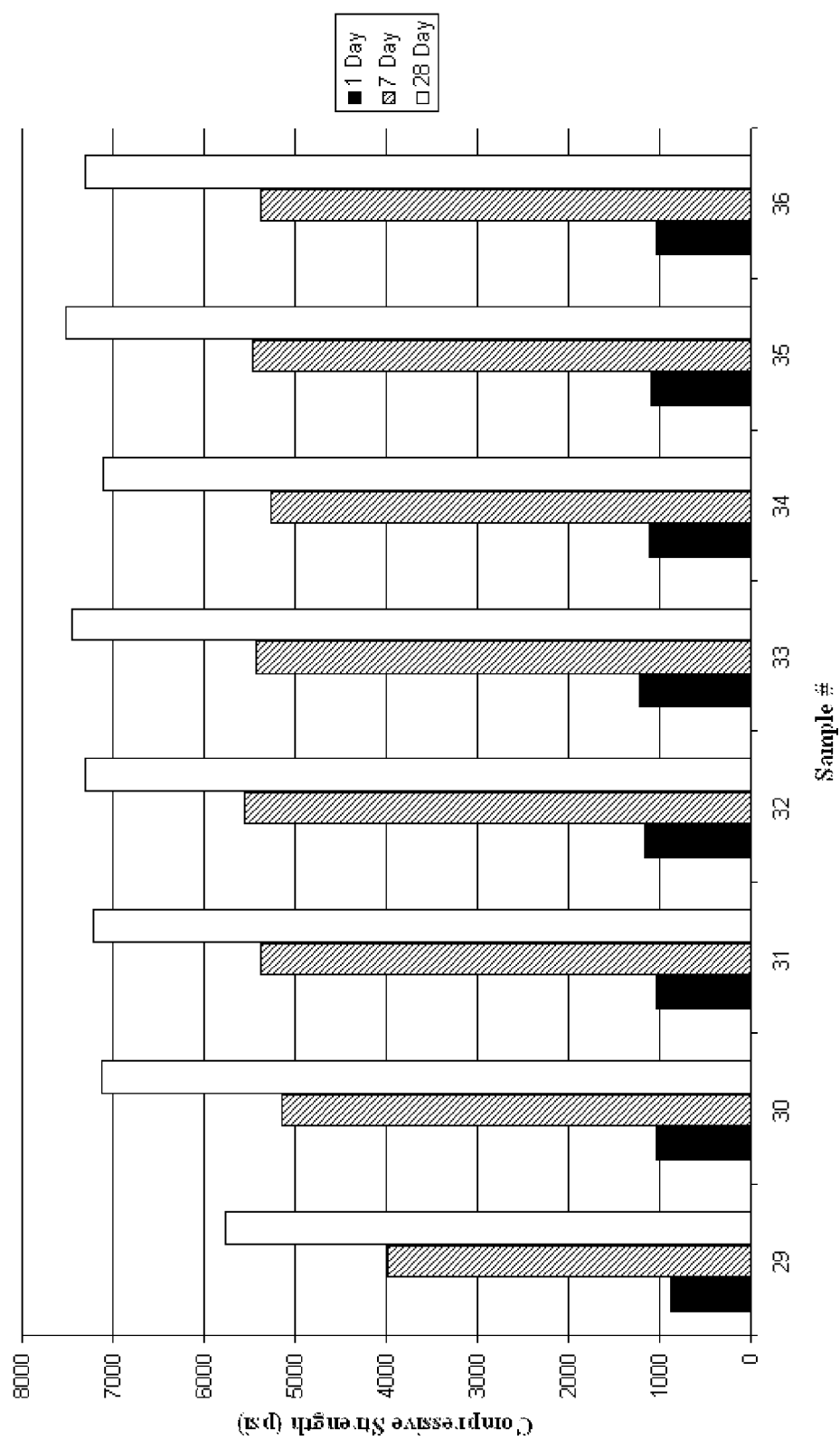
FIG. 5 is a graphical representation of compressive strength data of sample cementitious compositions containing slag.

As shown in FIG. 5, the desugared molasses of Admixture A, alone or in combination with Admixture B, increased the compressive strength of the cementitious composition containing slag as compared to a similar cementitious composition without admixtures.

Samples 37-41 were prepared using Type I Lehigh moderate-alkali cement to create concrete compositions with admixture dosages according to Table 8A. Samples 37-41 each contained cement, sand, stone and water. The water to cement proportion was 0.58 for Sample 37 and 0.52 for Samples 38-41. In all of Samples 37-41, the sand to total aggregate (sand and stone) proportion was 0.46, with Samples 38-41 having about 2% more aggregate than Sample 37, by weight. The results of the testing of Samples 37-41 are shown in Table 8B.

TABLE 8A

| Sample # | 37 | 38 | 39 | 40 | 41 |
|---|---|---|---|---|---|
| Admixture 1 | None | A | A | A | A |
| Dose (wt %) | | 0.105 | 0.105 | 0.105 | 0.105 |
| Admixture 2 | None | None | B | B | B |
| Dose (wt %) | | | 0.051 | 0.025 | 0.012 |

TABLE 8B

| Sample # | 37 | 38 | 39 | 40 | 41 |
|---|---|---|---|---|---|
| Slump (in) | 6.25 | 3.00 | 3.50 | 3.75 | 3.75 |
| Slump (cm) | 15.9 | 7.62 | 8.89 | 9.53 | 9.53 |
| Air Content (%) | 2.1 | 2.8 | 3.3 | 3.1 | 2.5 |
| Initial Set (hr) | 4.7 | 7.9 | 8.5 | 8.0 | 7.7 |
| Final Set (hr) | 6.9 | 10.0 | 10.4 | 9.9 | 9.6 |
| Comp. Strength | | | | | |
| 1 Day (psi) | 1420 | 1650 | 1990 | 2270 | 2200 |
| 1 Day (N/mm$^2$) | 9.79 | 11.4 | 13.7 | 15.6 | 15.2 |
| 7 Day (psi) | 3370 | 4200 | 4230 | 4530 | 4850 |
| 7 Day (N/mm$^2$) | 23.2 | 29.0 | 29.2 | 31.2 | 33.4 |
| 28 Day (psi) | 4670 | 5080 | 5090 | 5230 | 5630 |
| 28 Day (N/mm$^2$) | 32.2 | 35.0 | 35.1 | 36.1 | 38.8 |

Samples 42-46 were prepared using Type I Lehigh moderate-alkali cement and slag to create concrete compositions with admixture dosages according to Table 9A. Samples 42-46 each contained cement, slag, sand, stone and water. The water to cementitious material proportion was 0.58 for Sample 42 and 0.53 for Samples 43-46. In all of Samples 42-46, the slag represented 50% of the total cementitious materials, and the sand to total aggregate (sand and stone) proportion was 0.46, with Samples 43-46 having about 2% more aggregate than Sample 42, by weight. The results of the testing of Samples 42-46 are shown in Table 9B.

TABLE 9A

| Sample # | 42 | 43 | 44 | 45 | 46 |
|---|---|---|---|---|---|
| Admixture 1 | None | A | A | A | A |
| Dose (wt %) | | 0.105 | 0.105 | 0.105 | 0.105 |
| Admixture 2 | None | None | B | B | B |
| Dose (wt %) | | | 0.051 | 0.025 | 0.012 |

TABLE 9B

| Sample # | 42 | 43 | 44 | 45 | 46 |
|---|---|---|---|---|---|
| Slump (in) | 7.25 | 1.50 | 6.75 | 4.75 | 6.75 |
| Slump (cm) | 18.4 | 3.81 | 17.1 | 12.1 | 17.1 |
| Air Content (%) | 2.1 | 2.9 | 3.2 | 3.0 | 2.8 |
| Initial Set (hr) | 5.2 | 7.8 | 9.2 | 9.0 | 9.1 |
| Final Set (hr) | 7.9 | 11.0 | 11.7 | 11.2 | 11.7 |
| Comp. Strength | | | | | |
| 1 Day (psi) | 800 | 1070 | 850 | 950 | 810 |
| 1 Day (N/mm$^2$) | 5.51 | 7.38 | 5.86 | 6.55 | 5.58 |
| 7 Day (psi) | 3900 | 5450 | 4590 | 4880 | 4860 |
| 7 Day (N/mm$^2$) | 26.9 | 37.6 | 31.6 | 33.6 | 33.5 |
| 28 Day (psi) | 5790 | 6910 | 6320 | 6400 | 6760 |
| 28 Day (N/mm$^2$) | 39.9 | 47.6 | 43.6 | 44.1 | 46.6 |

Figure 6:
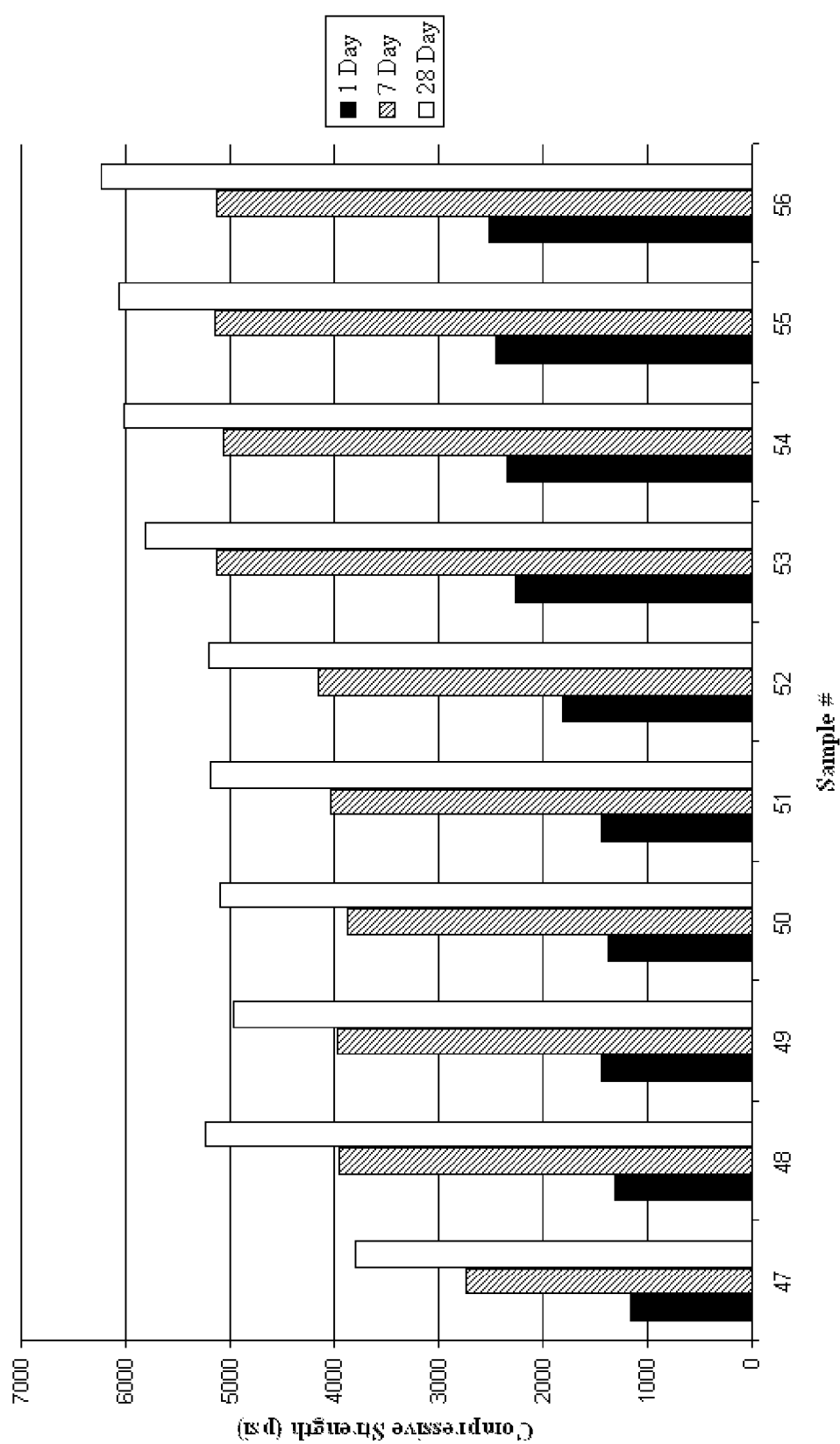
FIG. 6 is a graphical representation of compressive strength data of sample cementitious compositions with and without fly ash.

Samples 47-51 were prepared using Type I Lehigh moderate-alkali cement and Class F Fly Ash to create concrete compositions with admixture dosages according to Table 10A. Samples 47-51 each contained cement, fly ash, sand, stone and water. The water to cementitious material proportion was 0.53 for Sample 47 and 0.48 for Samples 48-51. In all of Samples 47-51, the fly ash represented 25% of the total cementitious materials, and the sand to total aggregate (sand and stone) proportion was 0.44, with Samples 48-51 having about 2% more aggregate than Sample 47, by weight. The admixtures C utilized in Samples 48-51 contained samples of desugared molasses which were obtained from different sugar beet molasses processing batches. The results of the testing of Samples 47-51 are shown in Table 10B. Compressive strength data from Table 10B Samples are shown in FIG. 6.

TABLE 10A

| Samples # | 47 | 48 | 49 | 50 | 51 |
|---|---|---|---|---|---|
| Admixture Dose (wt %) | None | C 0.12 | C 0.12 | C 0.12 | C 0.12 |

TABLE 10B

| Sample # | 47 | 48 | 46 | 50 | 51 |
|---|---|---|---|---|---|
| Slump (in) | 6.50 | 5.50 | 6.75 | 8.00 | 5.00 |
| Slump (cm) | 16.5 | 14.0 | 17.1 | 20.3 | 12.7 |
| Air Content (%) | 1.4 | 2.2 | 2.3 | 2.6 | 2.3 |
| Initial Set (hr) | 5.4 | 12.1 | 10.5 | 10.5 | 10.5 |
| Final Set (hr) | 7.4 | 13.8 | 12.4 | 12.2 | 11.9 |
| Comp. Strength | | | | | |
| 1 Day (psi) | 1150 | 1320 | 1430 | 1370 | 1430 |
| 1 Day (N/mm$^2$) | 7.93 | 9.10 | 9.86 | 9.44 | 9.86 |
| 7 Day (psi) | 2730 | 3960 | 3970 | 3880 | 4030 |
| 7 Day (N/mm$^2$) | 18.8 | 27.3 | 27.4 | 26.7 | 27.8 |
| 28 Day (psi) | 3790 | 5230 | 4970 | 5100 | 5190 |
| 28 Day (N/mm$^2$) | 26.1 | 36.1 | 34.3 | 35.2 | 35.8 |

Samples 52-56 were prepared using Type I Lehigh moderate-alkali cement to create concrete compositions with admixture dosages according to Table 11A. Samples 52-56 each contained cement, sand, stone and water. The water to cement proportion was 0.52 for Sample 52 and 0.48 for Samples 53-56. In all of Samples 52-56, the sand to total aggregate (sand and stone) proportion was 0.44, with Samples 53-56 having about 2% more aggregate than Sample 52, by weight. The admixtures C utilized in Samples 53-56 contained samples of desugared molasses which were obtained from different sugar beet molasses processing batches. The results of the testing of Samples 52-56 are shown in Table 11B. Compressive strength data from Table 11B Samples are shown in FIG. 6.

TABLE 11A

| Sample # | 52 | 53 | 54 | 55 | 56 |
|---|---|---|---|---|---|
| Admixture Dose (wt %) | None | C 0.12 | C 0.12 | C 0.12 | C 0.12 |

TABLE 11B

| Sample # | 52 | 53 | 54 | 55 | 56 |
|---|---|---|---|---|---|
| Slump (in) | 6.75 | 4.50 | 7.50 | 4.00 | 4.25 |
| Slump (cm) | 17.1 | 11.4 | 19.1 | 10.2 | 10.8 |
| Air Content (%) | 1.6 | 2.8 | 2.8 | 3.0 | 2.8 |
| Initial Set (hr) | 5.0 | 11.3 | 10.1 | 9.6 | 9.1 |
| Final Set (hr) | 6.5 | 12.8 | 11.9 | 11.3 | 10.7 |
| Comp. Strength | | | | | |
| 1 Day (psi) | 1820 | 2260 | 2350 | 2450 | 2510 |
| 1 Day (N/mm$^2$) | 12.6 | 15.6 | 16.2 | 16.9 | 17.3 |
| 7 Day (psi) | 4150 | 5130 | 5060 | 5140 | 5130 |
| 7 Day (N/mm$^2$) | 28.6 | 35.4 | 34.9 | 35.4 | 35.4 |
| 28 Day (psi) | 5200 | 5810 | 6020 | 6060 | 6230 |
| 28 Day (N/mm$^2$) | 35.8 | 40.1 | 41.5 | 41.8 | 42.9 |

As shown in FIG. 6, Admixture C containing desugared molasses increased the compressive strength of the cementitious composition (both with and without fly ash) as compared to similar cementitious compositions without admixtures.

Samples 57-61 were prepared using Type I Lehigh moderate-alkali cement and Class F Fly Ash to create concrete compositions with admixture dosages according to Table 12A. Samples 57-61 each contained cement, fly ash, sand, stone and water. The water to cementitious material proportion was 0.50 for Sample 57 and 0.45 for Samples 58-61. In all of Samples 57-61, the fly ash represented 25% of the total cementitious materials, and the sand to total aggregate (sand and stone) proportion was 0.42, with Samples 58-61 having about 3% more aggregate than Sample 57, by weight. The admixtures C utilized in Samples 58-61 contained samples of desugared molasses which were obtained from different sugar beet molasses processing batches. The results of the testing of Samples 57-61 are shown in Table 12B.

TABLE 12A

| Sample # | 57 | 58 | 59 | 60 | 61 |
|---|---|---|---|---|---|
| Admixture 1 | None | C | C | C | C |
| Dose (wt %) | | 0.12 | 0.12 | 0.12 | 0.12 |
| Admixture 2 | E | E | E | E | E |
| Dose (wt %) | 0.006 | 0.13 | 0.13 | 0.13 | 0.13 |
| Dose (oz/cwt) | 0.7 | 1.5 | 1.5 | 1.5 | 1.5 |

TABLE 12B

| Sample # | 57 | 58 | 59 | 60 | 61 |
|---|---|---|---|---|---|
| Slump (in) | 6.50 | 6.50 | 5.25 | 5.50 | 6.50 |
| Slump (cm) | 16.5 | 16.5 | 13.3 | 14.0 | 16.5 |
| Air Content (%) | 2.3 | 7.5 | 7.2 | 7.5 | 7.6 |
| Initial Set (hr) | | | | | |
| Final Set (hr) | | | | | |
| Comp. Strength | | | | | |
| 1 Day (psi) | | 710 | 700 | 820 | 630 |
| 1 Day (N/mm$^2$) | | 4.89 | 4.83 | 5.65 | 4.34 |
| 7 Day (psi) | | 3190 | 3140 | 3190 | 3020 |
| 7 Day (N/mm$^2$) | | 22.0 | 21.6 | 22.0 | 20.8 |
| 28 Day (psi) | | 4350 | 4090 | 4260 | 3930 |
| 28 Day (N/mm$^2$) | | 30.0 | 28.2 | 29.4 | 27.1 |

Samples 62-66 were prepared using Type I Lehigh moderate-alkali cement and Class F Fly Ash to create concrete compositions with admixture dosages according to Table 13A. Samples 62-66 each contained cement, fly ash, sand, stone and water. The water to cementitious material proportion was 0.50 for Sample 62 and 0.47 for Samples 63-66. In all of Samples 62-66, the fly ash represented 25% of the total cementitious materials, and the sand to total aggregate (sand and stone) proportion was 0.42, with Samples 63-66 having about 3% more aggregate than Sample 62, by weight. The admixtures C utilized in Samples 63-66 contained samples of desugared molasses which were obtained from different sugar beet molasses processing batches. The results of the testing of Samples 62-66 are shown in Table 13B.

TABLE 13A

| Sample # | 62 | 63 | 64 | 65 | 66 |
|---|---|---|---|---|---|
| Admixture Dose (wt %) | None | C 0.08 | C 0.08 | C 0.08 | C 0.08 |

TABLE 13B

| Sample # | 62 | 63 | 64 | 65 | 66 |
| --- | --- | --- | --- | --- | --- |
| Slump (in) | 5.00 | 4.00 | 3.75 | 4.00 | 4.75 |
| Slump (cm) | 12.7 | 10.2 | 9.53 | 10.2 | 12.1 |
| Air Content (%) | 1.6 | 2.3 | 2.4 | 2.5 | 2.5 |
| Initial Set (hr) | 8.8 | 14.5 | 14.0 | 14.6 | 15.2 |
| Final Set (hr) | 13.4 | 19.4 | 19.2 | 19.9 | 18.9 |
| Comp. Strength | | | | | |
| 3 Day (psi) | 1230 | 1910 | 1790 | 1820 | 1950 |
| 3 Day (N/mm$^2$) | 8.48 | 13.2 | 12.3 | 12.5 | 13.4 |
| 7 Day (psi) | 2300 | 3190 | 3160 | 3100 | 3170 |
| 7 Day (N/mm$^2$) | 15.9 | 22.0 | 21.8 | 21.4 | 21.9 |
| 28 Day (psi) | 3700 | 4700 | 4620 | 4770 | 4780 |
| 28 Day (N/mm$^2$) | 25.5 | 32.4 | 31.9 | 32.9 | 33.0 |

Samples 67-71 were prepared using Type I Lehigh moderate-alkali cement to create concrete compositions with admixture dosages according to Table 14A. Samples 67-71 each contained cement, sand, stone and water. The water to cement proportion was 0.51 for Sample 67 and 0.47 for Samples 68-71. In all of Samples 67-71, the sand to total aggregate (sand and stone) proportion was 0.42, with Samples 68-71 having about 3% more aggregate than Sample 67, by weight. The admixtures C utilized in Samples 68-71 contained samples of desugared molasses which were obtained from different sugar beet molasses processing batches. The results of the testing of Samples 67-71 are shown in Table 14B.

TABLE 14A

| Sample # | 67 | 68 | 69 | 70 | 71 |
| --- | --- | --- | --- | --- | --- |
| Admixture | None | C | C | C | C |
| Dose (wt %) | | 0.08 | 0.08 | 0.08 | 0.08 |

TABLE 14B

| Sample # | 67 | 68 | 69 | 70 | 71 |
| --- | --- | --- | --- | --- | --- |
| Slump (in) | 4.50 | 5.00 | 4.25 | 8.00 | 4.75 |
| Slump (cm) | 11.4 | 12.7 | 10.8 | 20.3 | 12.1 |
| Air Content (%) | 1.9 | 2.8 | 2.8 | 2.2 | 2.6 |
| Initial Set (hr) | 8.3 | 14.0 | 13.6 | 14.3 | 17.0 |
| Final Set (hr) | 12.0 | 18.2 | 17.1 | 17.8 | |
| Comp. Strength | | | | | |
| 3 Day (psi) | 1890 | 2780 | 2670 | 2340 | 2870 |
| 3 Day (N/mm$^2$) | 13.0 | 19.2 | 18.4 | 16.1 | 19.8 |
| 7 Day (psi) | 3440 | 4310 | 4340 | 3760 | 4530 |
| 7 Day (N/mm$^2$) | 23.7 | 29.7 | 29.9 | 25.9 | 31.2 |
| 28 Day (psi) | 5500 | 5960 | 6340 | 5490 | 6480 |
| 28 Day (N/mm$^2$) | 37.9 | 41.1 | 43.7 | 37.8 | 44.7 |

Figure 7:
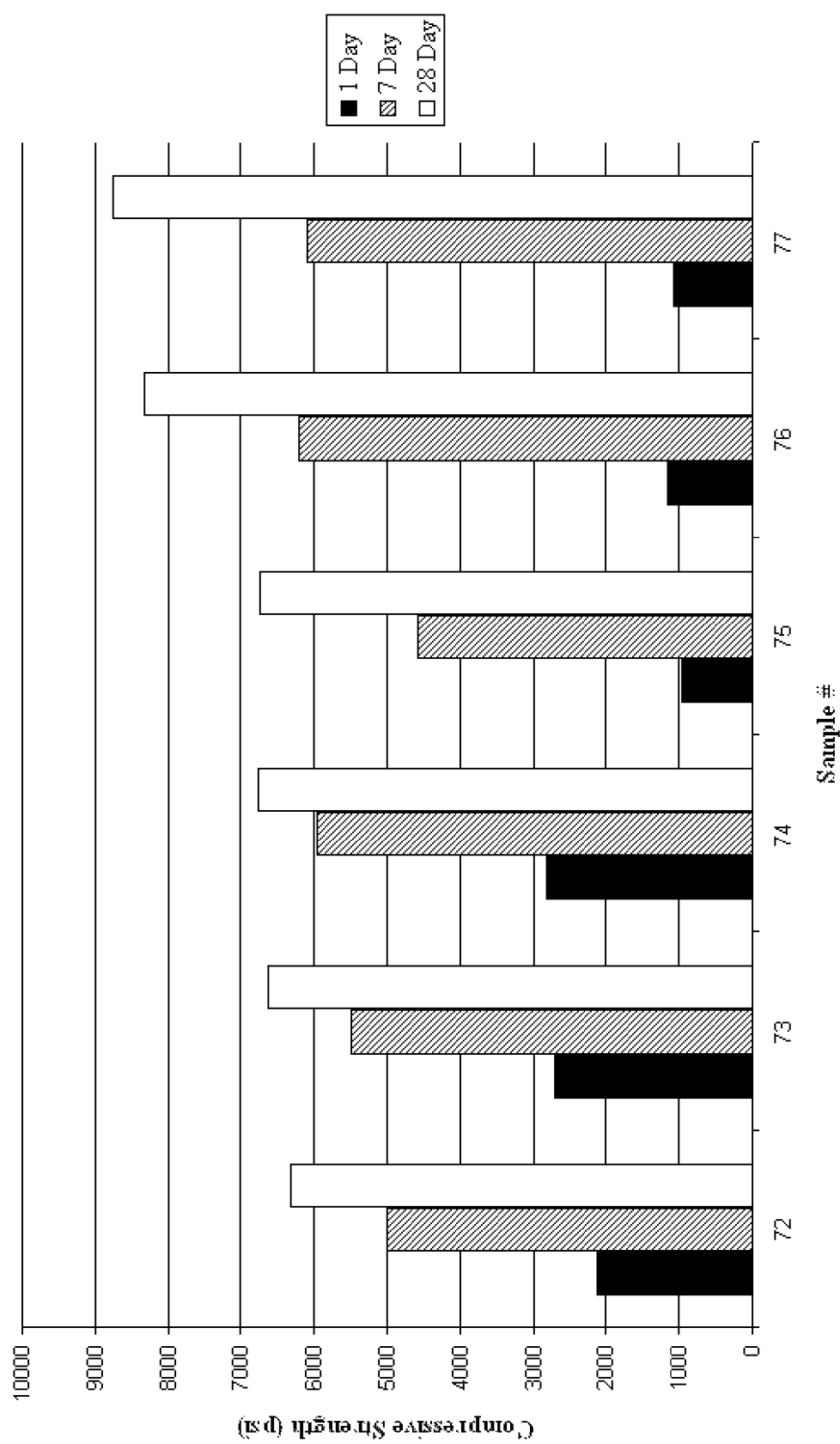
FIG. 7 is a graphical representation of compressive strength data of sample cementitious compositions with and without slag.

Samples 72-74 were prepared using Type I Lehigh moderate-alkali cement to create concrete compositions with admixture dosages according to Table 15A. Samples 72-74 each contained cement, sand, stone and water. The water to cement proportion was 0.51 for Sample 72 and 0.49 for Samples 73-74. In all of Samples 72-74, the sand to total aggregate (sand and stone) proportion was 0.42, with Samples 73-74 having about 3% more aggregate than Sample 72, by weight. The results of the testing of Samples 72-74 are shown in Table 15B. Compressive strength data from Table 15B Samples are shown in FIG. 7.

TABLE 15A

| Sample # | 72 | 73 | 74 |
| --- | --- | --- | --- |
| Admixture | None | C | D |
| Dose (wt %) | | 0.12 | 0.14 |

TABLE 15B

| Sample # | 72 | 73 | 74 |
| --- | --- | --- | --- |
| Slump (in) | 4.00 | 3.50 | 3.00 |
| Slump (cm) | 10.2 | 8.89 | 7.62 |
| Air Content (%) | 2.0 | 2.8 | 2.9 |
| Initial Set (hr) | 4.0 | 7.1 | 7.2 |
| Final Set (hr) | | | |
| Comp. Strength | | | |
| 1 Day (psi) | 2120 | 2690 | 2820 |
| 1 Day (N/mm$^2$) | 14.6 | 18.5 | 19.4 |
| 7 Day (psi) | 5010 | 5490 | 5970 |
| 7 Day (N/mm$^2$) | 34.5 | 37.8 | 41.2 |
| 28 Day (psi) | 6320 | 6630 | 6760 |
| 28 Day (N/mm$^2$) | 43.6 | 45.7 | 46.6 |

Samples 75-77 were prepared using Type I Lehigh moderate-alkali cement and slag to create concrete compositions with admixture dosages according to Table 16A. Samples 75-77 each contained cement, slag, sand, stone and water. The water to cementitious material proportion was 0.53 for Sample 75 and 0.48 for Samples 76-77. In all of Samples 75-77, the slag represented 50% of the total cementitious materials. The sand to total aggregate (sand and stone) proportion was 0.42 for Samples 75 and 77 and 0.43 for Sample 76. Sample 77 had about 3% more aggregate than Sample 75, by weight. The results of the testing of Samples 75-77 are shown in Table 16B. Compressive strength data from Table 16B Samples are shown in FIG. 7.

TABLE 16A

| Sample # | 75 | 76 | 77 |
| --- | --- | --- | --- |
| Admixture | None | C | D |
| Dose (wt %) | | 0.12 | 0.14 |

TABLE 16B

| Sample # | 75 | 76 | 77 |
| --- | --- | --- | --- |
| Slump (in) | 5.25 | 3.00 | 3.00 |
| Slump (cm) | 13.3 | 7.62 | 7.62 |
| Air Content (%) | 1.8 | 2.9 | 2.9 |
| Initial Set (hr) | 4.8 | 8.6 | 8.6 |
| Final Set (hr) | | | |
| Comp. Strength | | | |
| 1 Day (psi) | 950 | 1170 | 1080 |
| 1 Day (N/mm$^2$) | 6.55 | 8.07 | 7.45 |
| 7 Day (psi) | 4570 | 6200 | 6090 |
| 7 Day (N/mm$^2$) | 31.5 | 42.7 | 42.0 |
| 28 Day (psi) | 6730 | 8330 | 8750 |
| 28 Day (N/mm$^2$) | 46.4 | 57.4 | 60.3 |

As shown in FIG. 7, Admixtures C and D containing desugared molasses increased the compressive strength of the cementitious composition (both with and without slag) as compared to similar cementitious compositions without such admixtures.

Figure 8:
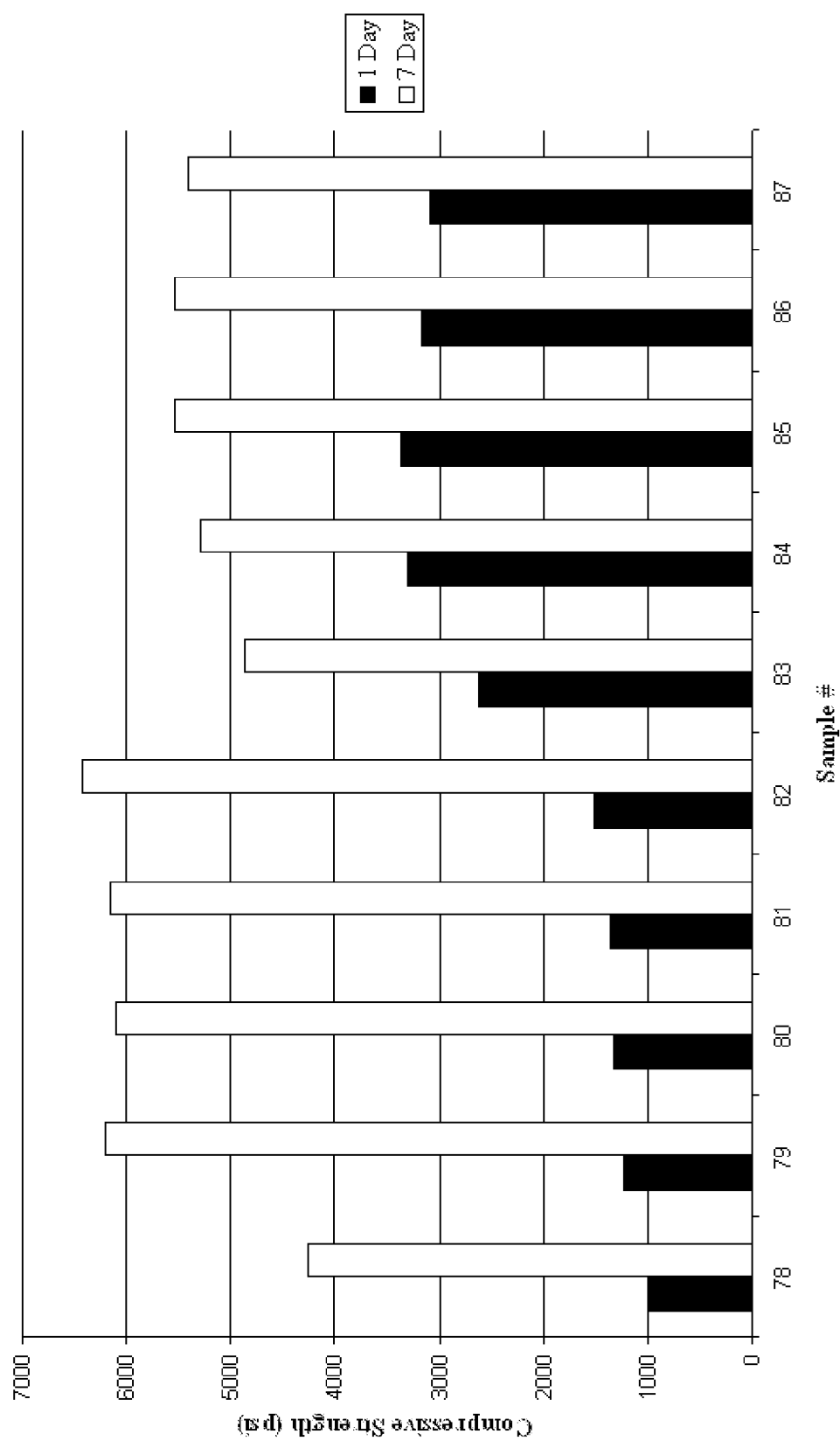
FIG. 8 is a graphical representation of compressive strength data of sample cementitious compositions with and without slag.

Samples 78-82 were prepared using Type I Lehigh moderate-alkali cement and slag to create concrete compositions with admixture dosages according to Table 17A. Samples 78-82 each contained cement, slag, sand, stone and water. The water to cementitious material proportion was 0.55 for Sample 78 and 0.50 for Samples 79-82. In all of Samples 78-82, the slag represented 50% of the total cementitious materials, and the sand to total aggregate (sand and stone) proportion was 0.42, with Samples 79-82 having about 3% more aggregate than Sample 78, by weight. The admixtures D utilized in Samples 79-82 contained samples of desugared molasses which were obtained from different sugar beet molasses processing batches. The results of the testing of Samples 78-82 are shown in Table 17B. Compressive strength data from Table 17B Samples are shown in FIG. 8.

TABLE 17A

| Sample # | 78 | 79 | 80 | 81 | 82 |
|---|---|---|---|---|---|
| Admixture | None | D | D | D | D |
| Dose (wt %) | | 0.14 | 0.14 | 0.14 | 0.14 |

TABLE 17B

| Sample # | 78 | 79 | 80 | 81 | 82 |
|---|---|---|---|---|---|
| Slump (in) | 6.50 | 4.00 | 4.00 | 4.00 | 4.50 |
| Slump (cm) | 16.5 | 10.2 | 10.2 | 10.2 | 11.4 |
| Air Content (%) | 1.9 | 2.6 | 2.8 | 2.6 | 2.8 |
| Initial Set (hr) | 4.4 | 9.5 | 8.9 | 8.9 | 9.0 |
| Final Set (hr) | 7.0 | 11.8 | 10.7 | 10.8 | 11.0 |
| Comp. Strength | | | | | |
| 1 Day (psi) | 990 | 1230 | 1330 | 1350 | 1510 |
| 1 Day (N/mm$^2$) | 6.83 | 8.48 | 9.17 | 9.31 | 10.4 |
| 7 Day (psi) | 4250 | 6200 | 6100 | 6160 | 6430 |
| 7 Day (N/mm$^2$) | 29.3 | 42.7 | 42.1 | 42.5 | 44.3 |

Samples 83-87 were prepared using Type I Lehigh moderate-alkali cement to create concrete compositions with admixture dosages according to Table 18A. Samples 83-87 each contained cement, sand, stone and water. The water to cement proportion was 0.53 for Sample 83 and 0.50 for Samples 84-87. In all of Samples 83-87, the sand to total aggregate (sand and stone) proportion was 0.42, with Samples 84-87 having about 3% more aggregate than Sample 83, by weight. The admixtures D utilized in Samples 84-87 contained samples of desugared molasses which were obtained from different sugar beet molasses processing batches. The results of the testing of Samples 83-87 are shown in Table 18B. Compressive strength data from Table 18B Samples are shown in FIG. 8.

TABLE 18A

| Sample # | 83 | 84 | 85 | 86 | 87 |
|---|---|---|---|---|---|
| Admixture | None | D | D | D | D |
| Dose (wt %) | | 0.14 | 0.14 | 0.14 | 0.14 |

TABLE 18B

| Sample # | 83 | 84 | 85 | 86 | 87 |
|---|---|---|---|---|---|
| Slump (in) | 4.50 | 2.00 | 2.75 | 3.00 | 3.50 |
| Slump (cm) | 11.4 | 5.08 | 6.99 | 7.62 | 8.89 |
| Air Content (%) | 2.0 | 2.8 | 2.9 | 2.9 | 2.9 |
| Initial Set (hr) | 4.3 | 8.3 | 7.8 | 7.5 | 7.8 |
| Final Set (hr) | 6.0 | 10.0 | 9.2 | 9.2 | 9.4 |
| Comp. Strength | | | | | |
| 1 Day (psi) | 2620 | 3310 | 3360 | 3160 | 3090 |
| 1 Day (N/mm$^2$) | 18.1 | 22.8 | 32.2 | 21.8 | 21.3 |
| 7 Day (psi) | 4860 | 5280 | 5540 | 5530 | 5410 |
| 7 Day (N/mm$^2$) | 33.5 | 36.4 | 38.2 | 38.1 | 37.3 |

As shown in FIG. 8, Admixture D containing desugared molasses increased the compressive strength of the cementitious composition as compared to similar cementitious compositions without such admixtures.

Samples 88-91 were prepared using Type I Lehigh moderate-alkali cement (Samples 88-89) and Type I Saylor high-alkali cement (Samples 90-91) to create concrete compositions with admixture dosages according to Table 19A. Samples 88-91 each contained cement, sand, stone and water. The water to cement proportion was 0.55 for Samples 88-89 and 0.54 for Samples 91-91. In all of Samples 88-91, the sand to total aggregate (sand and stone) proportion was 0.42. The results of the testing of Samples 88-91 are shown in Table 19B.

TABLE 19A

| Sample # | 88 | 89 | 90 | 91 |
|---|---|---|---|---|
| Admixture 1 | F | A | F | A |
| Dose (wt %) | 0.08 | 0.053 | 0.08 | 0.053 |
| Admixture 2 | None | B | None | B |
| Dose (wt %) | | 0.012 | | 0.012 |

TABLE 19B

| Sample # | 88 | 89 | 90 | 91 |
|---|---|---|---|---|
| Slump (in) | 5.00 | 6.00 | 7.00 | 6.00 |
| Slump (cm) | 12.7 | 15.2 | 17.8 | 15.2 |
| Air Content (%) | 1.6 | 1.5 | 7.6 | 7.5 |
| Initial Set (hr) | 5.3 | 5.2 | 5.9 | 5.8 |
| Final Set (hr) | 6.8 | 6.7 | 7.5 | 7.5 |
| Comp. Strength | | | | |
| 1 Day (psi) | 2210 | 2090 | 1730 | 1750 |
| 1 Day (N/mm$^2$) | 15.2 | 14.4 | 11.9 | 12.1 |
| 7 Day (psi) | 4950 | — | 3150 | 3270 |
| 7 Day (N/mm$^2$) | 34.1 | — | 21.7 | 22.5 |
| 28 Day (psi) | 5110 | 5040 | 3670 | 3900 |
| 28 Day (N/mm$^2$) | 35.2 | 34.7 | 25.3 | 26.9 |

Samples 92-95 were prepared using Type I Lehigh moderate-alkali cement (Samples 92-93) and Type I Saylor high-alkali cement (Samples 94-95) to create concrete compositions with admixture dosages according to Table 20A. Samples 92-95 each contained cement, fly ash, sand, stone and water. In all of Samples 92-95, the fly ash represented 25% of the total cementitious materials. The water to cementitious material proportion was 0.52 for Samples 92-95. The sand to total aggregate (sand and stone) proportion was 0.45 for Sample 92 and 0.42 for Samples 93-95. The results of the testing of Samples 92-95 are shown in Table 20B.

TABLE 20A

| Sample # | 92 | 93 | 94 | 95 |
|---|---|---|---|---|
| Admixture 1 | F | A | F | A |
| Dose (wt %) | 0.08 | 0.053 | 0.08 | 0.053 |

TABLE 20A-continued

| Sample # | 92 | 93 | 94 | 95 |
|---|---|---|---|---|
| Admixture 2 | None | B | None | B |
| Dose (wt %) | | 0.012 | | 0.012 |

TABLE 20B

| Sample # | 92 | 93 | 94 | 95 |
|---|---|---|---|---|
| Slump (in) | 6.25 | 4.75 | 5.75 | 5.50 |
| Slump (cm) | 15.9 | 12.1 | 14.6 | 14.0 |
| Air Content (%) | 2.0 | 2.1 | 5.9 | 5.5 |
| Initial Set (hr) | 7.0 | 6.2 | 6.5 | 6.4 |
| Final Set (hr) | 8.7 | 8.2 | 8.5 | 8.2 |
| Comp. Strength | | | | |
| 1 Day (psi) | 1220 | 1210 | 1230 | 1280 |
| 1 Day (N/mm$^2$) | 8.4 | 8.3 | 8.5 | 8.8 |
| 7 Day (psi) | 3180 | 3210 | 3030 | 2990 |
| 7 Day (N/mm$^2$) | 21.9 | 22.1 | 20.9 | 20.6 |
| 28 Day (psi) | 4540 | 4490 | 4160 | 4260 |
| 28 Day (N/mm$^2$) | 31.3 | 31.0 | 28.7 | 29.4 |

Samples 96-99 were prepared using Type I Lehigh moderate-alkali cement (Samples 96-97) and Type I Hercules high-alkali cement (Samples 98-99) to create concrete compositions with admixture dosages according to Table 21A. Samples 96-99 each contained cement, slag, sand, stone and water. In all of Samples 96-99, the slag represented 50% of the total cementitious materials. The water to cementitious material proportion was 0.56 for Samples 96-97 and 0.54 for Samples 98-99. The sand to total aggregate (sand and stone) proportion was 0.42 for Samples 96-99. The results of the testing of Samples 96-99 are shown in Table 21B.

TABLE 21A

| Sample # | 96 | 97 | 98 | 99 |
|---|---|---|---|---|
| Admixture 1 | F | A | F | A |
| Dose (wt %) | 0.08 | 0.053 | 0.08 | 0.053 |
| Admixture 2 | None | B | None | B |
| Dose (wt %) | | 0.012 | | 0.012 |

TABLE 21B

| Sample # | 96 | 97 | 98 | 99 |
|---|---|---|---|---|
| Slump (in) | 6.50 | 6.75 | 5.25 | 5.25 |
| Slump (cm) | 16.5 | 17.1 | 13.3 | 13.3 |
| Air Content (%) | 1.8 | 1.7 | 1.9 | 2.1 |
| Initial Set (hr) | 6.4 | 6.4 | 6.5 | 6.0 |
| Final Set (hr) | 8.5 | 8.6 | 8.8 | 7.9 |
| Comp. Strength | | | | |
| 1 Day (psi) | 800 | 770 | 740 | 780 |
| 1 Day (N/mm$^2$) | 5.5 | 5.3 | 5.1 | 5.4 |
| 7 Day (psi) | 4720 | 4150 | 4290 | 4370 |
| 7 Day (N/mm$^2$) | 32.5 | 28.6 | 29.6 | 30.1 |
| 28 Day (psi) | 6460 | 6190 | 6730 | 6960 |
| 28 Day (N/mm$^2$) | 44.5 | 42.7 | 46.4 | 48.0 |

Samples 100-103 were prepared using Type I Hercules high-alkali cement to create concrete compositions with admixture dosages according to Table 22A. Samples 100-103 each contained cement, sand, stone and water. The water to cementitious material proportion was 0.56 for Samples 100-101 and 103, and 0.52 for Sample 102. The sand to total aggregate (sand and stone) proportion was 0.45 for Samples 100-103. The results of the testing of Samples 100-103 are shown in Table 22B.

TABLE 22A

| Sample # | 100 | 101 | 102 | 103 |
|---|---|---|---|---|
| Admixture 1 | F | A | A | A |
| Dose (wt %) | 0.11 | 0.071 | 0.071 | 0.071 |
| Admixture 2 | None | B | B | None |
| Dose (wt %) | | 0.051 | 0.025 | |

TABLE 22B

| Sample # | 100 | 101 | 102 | 103 |
|---|---|---|---|---|
| Slump (in) | 5.00 | 5.00 | 6.25 | 5.75 |
| Slump (cm) | 12.7 | 12.7 | 15.9 | 14.6 |
| Air Content (%) | 2.7 | 2.8 | 2.7 | 2.5 |
| Initial Set (hr) | 9.7 | 8.5 | 8.5 | 7.9 |
| Final Set (hr) | 12.7 | 11.5 | 11.7 | 11.2 |
| Comp. Strength | | | | |
| 1 Day (psi) | — | — | — | — |
| 1 Day (N/mm$^2$) | — | — | — | — |
| 7 Day (psi) | 3760 | 3630 | 3500 | 3590 |
| 7 Day (N/mm$^2$) | 25.9 | 25.0 | 24.1 | 24.8 |
| 28 Day (psi) | 5140 | 5030 | 4870 | 5040 |
| 28 Day (N/mm$^2$) | 35.4 | 34.7 | 33.6 | 34.7 |

Samples 104-108 were prepared using Type I APC low-alkali cement to create concrete compositions with admixture dosages according to Table 23A. Samples 104-108 each contained cement, fly ash, sand, stone and water. In all of Samples 104-108, the fly ash represented 25% of the total cementitious materials. The water to cementitious material proportion was 0.54 for Samples 104-108. The sand to total aggregate (sand and stone) proportion was 0.44 for Samples 104-108. The results of the testing of Samples 104-108 are shown in Table 23B.

TABLE 23A

| Sample # | 104 | 105 | 106 | 107 | 108 |
|---|---|---|---|---|---|
| Admixture 1 | F | A | A | A | A |
| Dose (wt %) | 0.11 | 0.071 | 0.071 | 0.071 | 0.071 |
| Admixture 2 | None | None | B | B | B |
| Dose (wt %) | | | 0.009 | 0.017 | 0.034 |

TABLE 23B

| Sample # | 104 | 105 | 106 | 107 | 108 |
|---|---|---|---|---|---|
| Slump (in) | 6.75 | 6.00 | 7.00 | 7.50 | 6.50 |
| Slump (cm) | 17.1 | 15.2 | 17.8 | 19.1 | 16.5 |
| Air Content (%) | 1.9 | 1.5 | 1.6 | 0.9 | 2.2 |
| Initial Set (hr) | 12.7 | 13.7 | 12.9 | 12.6 | 13.3 |
| Final Set (hr) | 17.1 | 19.1 | 18.5 | 17.9 | 18.6 |
| Comp. Strength | | | | | |
| 3 Day (psi) | 1440 | 1240 | 1460 | 1500 | 1430 |
| 3 Day (N/mm$^2$) | 9.9 | 8.5 | 10.1 | 10.3 | 9.9 |
| 7 Day (psi) | 2930 | 2630 | 2700 | 2910 | 2810 |
| 7 Day (N/mm$^2$) | 20.2 | 18.1 | 18.6 | 20.1 | 19.4 |
| 28 Day (psi) | 3890 | 3700 | 3820 | 3800 | 3810 |
| 28 Day (N/mm$^2$) | 26.8 | 25.5 | 26.3 | 26.2 | 26.3 |

Samples 109-113 were prepared using Type I Hercules high-alkali cement to create concrete compositions with admixture dosages according to Table 24A. Samples 109-113 each contained cement, fly ash, sand, stone and water. In all of Samples 109-113, the fly ash represented 25% of the total cementitious materials. The water to cementitious material proportion was 0.54 for Samples 109-113. The sand to total aggregate (sand and stone) proportion was 0.44 for Samples 109-113. The results of the testing of Samples 109-113 are shown in Table 24B.

TABLE 24A

| Sample # | 109 | 110 | 111 | 112 | 113 |
|---|---|---|---|---|---|
| Admixture 1 | F | A | A | A | A |
| Dose (wt %) | 0.11 | 0.071 | 0.071 | 0.071 | 0.071 |
| Admixture 2 | None | None | B | B | B |
| Dose (wt %) | | | 0.009 | 0.017 | 0.034 |

TABLE 24B

| Sample # | 109 | 110 | 111 | 112 | 113 |
|---|---|---|---|---|---|
| Slump (in) | 5.00 | 6.50 | 5.75 | 6.25 | 5.25 |
| Slump (cm) | 12.7 | 16.5 | 14.6 | 15.9 | 13.3 |
| Air Content (%) | 2.3 | 2.2 | 2.2 | 2.5 | 2.7 |
| Initial Set (hr) | 12.3 | 12.2 | 11.7 | 12.5 | 13.0 |
| Final Set (hr) | 16.2 | 16.5 | 16.3 | 17.3 | 17.6 |
| Comp. Strength | | | | | |
| 3 Day (psi) | 1300 | 1350 | 1400 | 1420 | 1360 |
| 3 Day (N/mm$^2$) | 9.0 | 9.3 | 9.7 | 9.8 | 9.4 |
| 7 Day (psi) | 2110 | 2200 | 2300 | 2230 | 2250 |
| 7 Day (N/mm$^2$) | 14.5 | 15.2 | 15.9 | 15.4 | 15.5 |
| 28 Day (psi) | 2940 | 3300 | 3320 | 3250 | 3060 |
| 28 Day (N/mm$^2$) | 20.3 | 22.8 | 22.9 | 22.4 | 21.1 |

The results of the experimentation performed on the Samples listed above shows that the use of a suitable waste material such as desugared molasses may provide improved results when compared to cementitious compositions without admixtures.

In a first embodiment, a cementitious composition may comprise at least one cementitious and/or pozzolanic material and at least one desugared molasses.

The cementitious composition of the first embodiment may include that the at least one cementitious and/or pozzolanic material comprises at least one of cement, fly ash, slag, silica fume or metakaolin.

The cementitious composition of either or both of the first or subsequent embodiments may further include that the at least one desugared molasses comprises at least one of desugared sugar beet molasses, desugared sugar cane molasses or soy molasses.

The cementitious composition of any of the first or subsequent embodiments may further include that the at least one desugared molasses contains an effective amount of from greater than 0% to about 45% sugars by weight, based on the dry weight of the at least one desugared molasses.

The cementitious composition of any of the first or subsequent embodiments may further include that the at least one desugared molasses contains an effective of amount of from greater than 0% to about 40% sucrose by weight, based on the dry weight of the at least one desugared molasses.

The cementitious composition of any of the first or subsequent embodiments may further include that the at least one desugared molasses is present in the cementitious composition in an amount of from about 0.005 to about 0.4 dry weight percent, based on the weight of cementitious material. The at least one desugared molasses may be present in the cementitious composition in an amount of from about 0.01 to about 0.25 dry weight percent, based on the weight of cementitious material. The at least one desugared molasses may be present in the cementitious composition in an amount of from about 0.02 to about 0.4 dry weight percent, based on the weight of cementitious material. The at least one desugared molasses may be present in the cementitious composition in an amount of from about 0.02 to about 0.25 dry weight percent, based on the weight of cementitious material.

The cementitious composition of any of the first or subsequent embodiments may further comprise at least one set accelerator and/or at least one strength enhancer. The at least one set accelerator and/or at least one strength enhancer may be present in the cementitious composition in an amount of from about 0.0002 to about 2 weight percent not including added water, based on the weight of cementitious material.

The cementitious composition of any of the first or subsequent embodiments may further comprise at least one alkanolamine and/or at least one polyhydroxyalkylamine. The at least one alkanolamine and/or at least one polyhydroxyalkylamine may be present in the cementitious composition in an amount of from about 0.008 to about 0.1 weight percent not including added water, based on the weight of cementitious material.

In a second embodiment, a method of preparing a cementitious composition may comprise forming a mixture of water, at least one cementitious and/or pozzolanic material, and at least one desugared molasses.

The method of the second embodiment may further include that the at least one cementitious and/or pozzolanic material comprises at least one of cement, fly ash, slag, silica fume or metakaolin.

The method of either or both of the second or subsequent embodiments may further include that the at least one desugared molasses comprises at least one of desugared sugar beet molasses, desugared sugar cane molasses or soy molasses.

The method of any of the second or subsequent embodiments may further include that the at least one desugared molasses contains an effective amount of from greater than 0% to about 45% sugars by weight, based on the dry weight of the at least one desugared molasses.

The method of any of the second or subsequent embodiments may further include that the at least one desugared molasses contains an effective amount of from greater than 0% to about 40% sucrose by weight, based on the dry weight of the at least one desugared molasses.

The method of any of the second or subsequent embodiments may further include that the at least one desugared molasses is present in the cementitious composition in an amount of from about 0.005 to about 0.4 dry weight percent, based on the weight of cementitious material. The at least one desugared molasses may be added to the cementitious composition in an amount of from about 0.01 to about 0.25 dry weight percent, based on the weight of cementitious material. The at least one desugared molasses may be added to the cementitious composition in an amount of from about 0.02 to about 0.4 dry weight percent, based on the weight of cementitious material. The at least one desugared molasses may be added to the cementitious composition in an amount of from about 0.02 to about 0.25 dry weight percent, based on the weight of cementitious material.

The method of any of the second or subsequent embodiments may further comprise adding at least one set accelerator and/or at least one strength enhancer to the cementitious composition, optionally in formulation with the desugared molasses. The at least one set accelerator and/or at least one strength enhancer may be added to the cementitious composition or present in the desugared molasses formulation in an amount of from about 0.0002 to about 2 weight percent not including added water, based on the weight of cementitious material.

The method of any of the second or subsequent embodiments may further comprise adding at least one alkanolamine and/or at least one polyhydroxyalkylamine to the cementitious composition, optionally in formulation with the desugared molasses. The at least one alkanolamine and/or at least one polyhydroxyalkylamine may be added to the cementitious composition or present in the desugared molasses formulation in an amount of from about 0.008 to about 0.1 weight percent not including added water, based on the weight of cementitious material.

In a third embodiment, an admixture for cementitious compositions may comprise: (i) at least one desugared molasses; and (ii) at least one additional active admixture component, optionally at least one of a water reducer, set retarder, set accelerator, strength enhancer, air detrainer, corrosion inhibitor, shrinkage reducers, viscosity modifiers, water proffers, permeability reducers, alkali silica reducers, or combinations thereof.

The admixture of the third embodiment may further include that the set accelerator and/or strength enhancer comprises at least one alkanolamine and/or at least one polyhydroxyalkylamine.

The admixture of either or both of the third or subsequent embodiments may further include that the at least one desugared molasses comprises at least one of desugared sugar beet molasses, desugared sugar cane molasses or soy molasses.

The admixture of any of the third or subsequent embodiments may further include the at least one desugared molasses contains an effective amount of from greater than 0% to about 45% sugars by weight, based on the dry weight of the at least one desugared molasses.

The admixture of any of the third or subsequent embodiments may further include that the at least one desugared molasses contains an effective amount of from greater than 0% to about 40% sucrose by weight, based on the weight of the at least one desugared molasses.

The admixture of any of the third or subsequent embodiments may further include that the at least one desugared molasses is present in the admixture in an amount of from about 2 to about 98 weight percent, based on the total weight of the admixture. The at least one desugared molasses may be present in the admixture in an amount of from about 8 to about 62 weight percent, based on the total weight of the admixture.

The admixture of any of the third or subsequent embodiments may further include that the at least one alkanolamine and/or at least one polyhydroxyalkylamine is present in the admixture in an amount of from about 0.1 to about 25 weight percent, based on the total weight of the admixture. The at least one alkanolamine and/or at least one polyhydroxyalkylamine may be present in the admixture in an amount of from about 0.2 to about 15 weight percent, based on the total weight of the admixture.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A cementitious composition comprising at least one cementitious and/or pozzolanic material and at least one desugared molasses comprising 12 to 22% by weight sucrose based on the total weight of the desugared molasses, wherein the at least one desugared molasses does not include by-products of molasses fermentation processes, and wherein the at least one cementitious and/or pozzolanic material comprises at least one of portland cement, calcium aluminate cement, magnesium phosphate cement, magnesium potassium phosphate cement, calcium sulfoaluminate cement, slag, silica fume, metakaolin, diatomaceous earth, opaline chert, clay, shale, volcanic tuff or pumicite.

2. The cementitious composition of claim 1, wherein the at least one desugared molasses comprises at least one of desugared sugar beet molasses, desugared sugar cane molasses or soy molasses.

3. The cementitious composition of claim 1, wherein the at least one desugared molasses contains an amount of from greater than 0% to about 45% sugars by weight, based on the dry weight of the at least one desugared molasses.

4. The cementitious composition of claim 1, wherein the at least one desugared molasses is present in the cementitious composition in an amount of from about 0.005 to about 0.4 dry weight percent, based on the weight of cementitious material.

5. The cementitious composition of claim 4, wherein the at least one desugared molasses is present in the cementitious composition in an amount of from about 0.01 to about 0.25 dry weight percent, based on the weight of cementitious material.

6. The cementitious composition of claim 4, wherein the at least one desugared molasses is present in the cementitious composition in an amount of from about 0.02 to about 0.4 dry weight percent, based on the weight of cementitious material.

7. The cementitious composition of claim 4, wherein the at least one desugared molasses is present in the cementitious composition in an amount of from about 0.02 to about 0.25 dry weight percent, based on the weight of cementitious material.

8. The cementitious composition of claim 1, further comprising at least one set accelerator and/or at least one strength enhancer.

9. The cementitious composition of claim 8, wherein the at least one set accelerator and/or at least one strength enhancer is present in the cementitious composition in an amount of from about 0.0002 to about 2 weight percent not including added water, based on the weight of cementitious material.

10. A method of preparing a cementitious composition comprising forming a mixture of water, at least one cementitious and/or pozzolanic material, and at least one desugared molasses comprising 12 to 22% by weight sucrose based on the total weight of the desugared molasses, wherein the at least one desugared molasses does not include by-products of molasses fermentation processes, and wherein the at least one cementitious and/or pozzolanic material comprises at least one of portland cement, calcium aluminate cement, magnesium phosphate cement, magnesium potassium phosphate cement, calcium sulfoaluminate cement, slag, silica fume, metakaolin, diatomaceous earth, opaline chert, clay, shale, volcanic tuff or pumicite.

11. The method of claim 10, wherein the at least one desugared molasses comprises at least one of desugared sugar beet molasses, desugared sugar cane molasses or soy molasses.

12. The method of claim 10, wherein the at least one desugared molasses contains from greater than 0% to about 45% sugars by weight, based on the dry weight of the at least one desugared molasses.

13. The method of claim 10, wherein the at least one desugared molasses is present in the cementitious composition in an amount of from about 0.005 to about 0.4 dry weight percent, based on the weight of cementitious material.

14. The method of claim 13, wherein the at least one desugared molasses is added to the cementitious composition in an amount of from about 0.01 to about 0.25 dry weight percent, based on the weight of cementitious material.

15. The method of claim 13, wherein the at least one desugared molasses is added to the cementitious composition in an amount of from about 0.02 to about 0.4 dry weight percent, based on the weight of cementitious material.

16. The method of claim 13, wherein the at least one desugared molasses is added to the cementitious composition in an amount of from about 0.02 to about 0.25 dry weight percent, based on the weight of cementitious material.

17. The method of claim 10, further comprising adding at least one set accelerator and/or at least one strength enhancer to the cementitious composition, optionally in formulation with the desugared molasses.

18. The method of claim 17, wherein the at least one set accelerator and/or at least one strength enhancer is added to the cementitious composition or is present in the desugared molasses formulation in an amount of from about 0.0002 to about 2 weight percent not including added water, based on the weight of cementitious material.

19. An admixture for cementitious compositions comprising: (i) at least one desugared molasses comprising 12 to 22% by weight sucrose based on the total weight of the desugared molasses; and (ii) at least one alkanolamine and/or at least one polyhydroxyalkylamine; the admixture capable of effecting at least one of water reduction, set retardation, air entrainment, or increased compressive strength in the cementitious compositions; the admixture further comprising (iii) at least one additional active admixture component comprising at least one of an additional water reducer, an additional set retarder, set accelerator, strength enhancer, air detrainer, corrosion inhibitor, shrinkage reducers, viscosity modifiers, water proffers, permeability reducers, alkali silica reducers, or combinations thereof, wherein the at least one desugared molasses does not include by-products of molasses fermentation processes.

20. The admixture of claim 19, wherein the at least one desugared molasses comprises at least one of desugared sugar beet molasses, desugared sugar cane molasses or soy molasses.

21. The admixture of claim 19, wherein the at least one desugared molasses contains an amount of from greater than 0% to about 45% sugars by weight, based on the dry weight of the at least one desugared molasses.

22. The admixture of claim 19, wherein the at least one desugared molasses is present in the admixture in an amount of from about 2 to about 98 weight percent, based on the total weight of active ingredients of the admixture.

23. The admixture of claim 22, wherein the at least one desugared molasses is present in the admixture in an amount of from about 8 to about 62 weight percent, based on the total weight of active ingredients of the admixture.

24. The admixture of claim 19, wherein the at least one alkanolamine and/or at least one polyhydroxyalkylamine is present in the admixture in an amount of from about 0.1 to about 25 weight percent, based on the total weight of active ingredients of the admixture.

25. The admixture of claim 24, wherein the at least one alkanolamine and/or at least one polyhydroxyalkylamine is present in the admixture in an amount of from about 0.2 to about 15 weight percent, based on the total weight of active ingredients of the admixture.

* * * * *